United States Patent [19]

Rizzi

[11] 4,435,753
[45] Mar. 6, 1984

[54] REGISTER ALLOCATION SYSTEM USING RECURSIVE QUEUING DURING SOURCE CODE COMPILATION

[75] Inventor: John R. Rizzi, San Jose, Calif.

[73] Assignee: International Business Machines Corporation, Armonk, N.Y.

[21] Appl. No.: 202,900

[22] Filed: Nov. 3, 1980

[51] Int. Cl.[3] .......................... G06F 9/00; G06F 9/30; G06F 9/44
[52] U.S. Cl. .................................. 364/200; 364/300
[58] Field of Search ... 364/200 MS File, 900 MS File, 364/300, 148-152; 371/19

[56] References Cited

U.S. PATENT DOCUMENTS

| | | | |
|---|---|---|---|
| 3,400,371 | 9/1968 | Amdahl et al. | |
| 3,496,551 | 2/1970 | Driscoll | 364/300 |
| 3,702,006 | 10/1972 | Page | 364/300 |
| 4,205,371 | 5/1980 | Feather | 364/300 |
| 4,378,590 | 3/1983 | Kim | 364/200 |
| 4,398,249 | 8/1983 | Pardo et al. | 364/300 |
| 4,399,504 | 8/1983 | Obermarck et al. | 364/200 |

OTHER PUBLICATIONS

F. R. A. Hopgood, Compiling Techniques, American Elsevier, N.Y., pp. 96-103, 1969.
L. A. Belady, A Study of Replacement Algorithms for a Virtual-Storage Computer, IBM Systems Journal, vol. 5, No. 2, 1966, pp. 86-89.
J. C. Beatty, Register Assignment Algorithm for Generation of Highly Optimized Object Code, IBM J. Res. Develop., 1/74, pp. 20-39.

Primary Examiner—James D. Thomas
Assistant Examiner—Archie E. Williams, Jr.
Attorney, Agent, or Firm—Shelley M. Beckstrand

[57] ABSTRACT

A computing system operates upon register requests serially referenced in an instruction stream to assign quantities to registers selected from unlike subsets or classes of registers. During compilation, the register usage of quantities serially scanned in the instruction stream is determined. Upon determining during the serial scan the need for a new quantity in a register, the quantity is logged to a queue, or pending set, of load point quantities and assigned a complete set count indicative of the number of registers the quantity requires, plus the number of permanent registers, plus the number of restricted registers, plus the number of registers in register classes for which it is not a candidate. Upon determining during the serial scan the reuse of a quantity in a register (already assigned or pending assignment), the complete set counts of quantities in the pending set which are candidates for a same register class as the reuse quantity are incremented. When the complete set count for a quantity equals the total number of available registers, a complete set is detected and the quantity is assigned to the remaining register. The register assignment procedure is recursively executed to generate load instructions for addressability register manipulations conditionally for base address constants not already in a register.

6 Claims, 39 Drawing Figures

PASS 1.ED

PASS 1. EHE

REGISTER-MANAGER

REGISTER-ASSIGNER

REGISTER ASSIGNER. EF

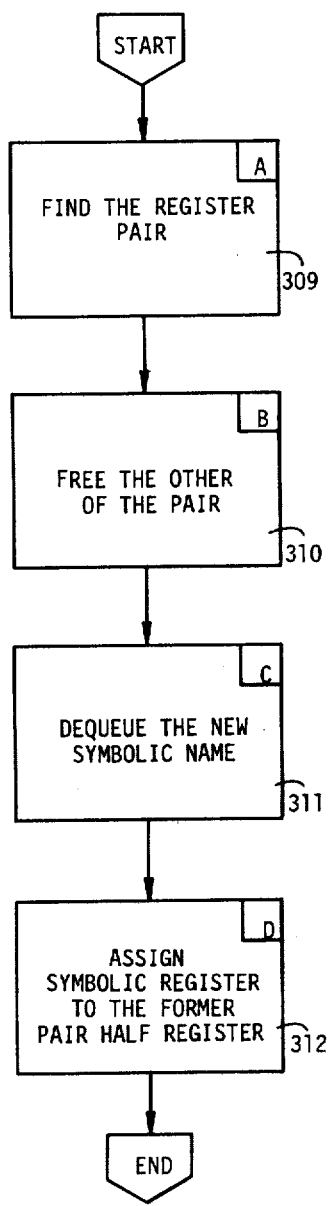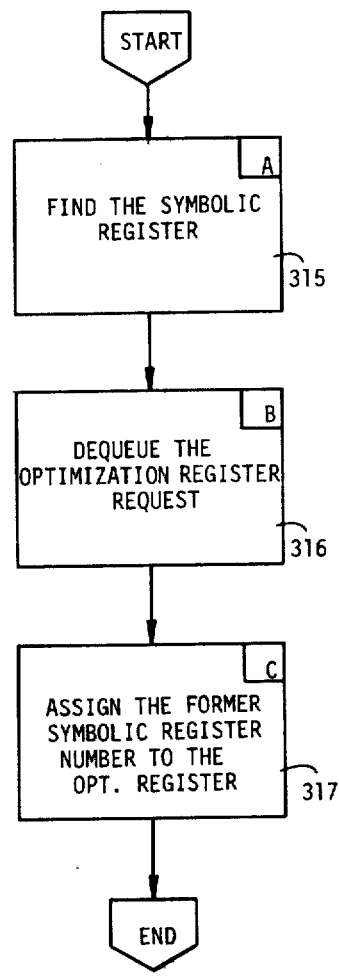
FIG. 27
FIG. 28

GET-A-REGISTER

GET-A-REGISTER. T

PROCESS-PAIR. E

PASS 2.D
PROCESS INSTRUCTION

REGISTER-RESOLVER

REGISTER ALLOCATION SYSTEM USING RECURSIVE QUEUING DURING SOURCE CODE COMPILATION

BACKGROUND OF THE INVENTION

1. Field of the Invention

This invention relates to a method for operating a computing system to optimize the utilization of machine resources. More specifically, it relates to the compilation of a high level language instruction stream to optimize in the object code instruction stream the assignment of unlike subsets of registers across basic blocks of straight line code and among non-uniform data register requests.

2. Description of the Prior Art

As used in this specification, the term "computing system" includes a central processing unit (CPU) with main storage, the CPU including a plurality of registers, and input/output (I/O) and storage devices coupled thereto, such as is described in G. M. Amdahl, et al, U.S. Pat. No. 3,400,371, issued Sept. 3, 1968 and entitled, "Data Processing System".

An application program, or high level language program, is a program written in a form with which a user of a computing system is familiar, rather than in machine language, and includes a coded instruction stream which is machine convertible into a plurality of serially executable (straight line code) source statements, selected source statements including one or more operands in the form of symbolic addresses, and other selected source statements requiring conditional or unconditional branches to still another source statement identified by a label (basic blocks of code being straight line code bounded by branches and identified, in some embodiments, by labels).

A compiler is a program which operates a computing system, taking as its input the machine readable instruction stream of a program written in a hih level language, to interpret the source statements and produce object code. The object code is suitable for link editing into a load module which is directly executable by the computing system, and generally includes more than one object (machine language) instruction for each source statement. One function of a compiler is to allocate or assign quantities referenced in the source statement operands to specific machine registers (see U.S. Pat. No. 3,400,371, column 38, lines 145-152). In so doing, because there are usually many more unique operand quantities than machine registers, it is necessary to include in the object code stream register load instructions, such as the LR, L, LH, LER, LE, LDR, LD instructions described at columns 66 and 76 of Amdahl U.S. Pat. No. 3,400,371, and backstore instructions, such as the ST and STE, STD store instructions described at columns 70, 71, 79 of Amdahl U.S. Pat. No. 3,400,371. A significant characteristic of a register set such as that described in Amdahl U.S. Pat. No. 3,400,371 (column 38) is that it comprises many unlike subsets; thus, it is partitioned into a plurality of disjoint sets (e.g., fixed vs. floating point), overlapping (e.g., general purpose registers vs. general purpose pairs) and/or general purpose registers except a given register for addressing. Furthermore, specified registers may be temporarily restricted from assignment, either because they are pre-empted by the hardware/microcode implementation (e.g., registers 1,2 used in the translate and test instruction) or, because they are pre-empted by software architecture (e.g., register convention on linkage registers to subrountines). Finally, one or more general purpose registers may be preempted by a compiler as global registers, the contents of which must be known and managed by the compiler register assignment facility but may not be displaced (e.g., registers reserved for address path calculations). The need for optimization of register assignment occurs when, for a machine with a fixed number of registers (N), all N registers contain quantities which may be used further on in the computation and a register is required to contain yet another unique quantity. There is a cost associated with a subsequent register load of the quantity which is displaced if that quantity is again referenced. Also, a cost is associated with saving in storage a quantity which is not "read only". Optimization requires that the registers be chosen for quantities in a way which will minimize the cost of instructions to displace and restore quantities in registers.

The solution to optimal register assignment is to provide an oracle that can look ahead when a register is required to find out which of the quantities currently is registers may be displaced with the lowest cost. This can be done in a number of ways.

If the text (or instruction stream) is all available for perusal then the oracle is easily implemented. Many optimization approaches in the theoretical prior art assume this condition. However, such is not the case when performing the register assignment activity for almost all "real-life" application programs because the main storage available to the compiler is insufficient in size to store the entire application program. Alternatively, at the point in the instruction stream where the oracle must be invoked, the instruction stream is read and saved in storage until the determination of the best register to use is made. However, because instruction streams can be arbitrarily long and the storage capacity of computing systems is finite, this strategy is bounded by the space available for the stream. A solution to the above bounding problem is to first read the text backwards, recording at each reference to a quantity the point at which a previous reference to the quantity was made. The result of that operation is readily translatable to a NEXT function and in the subsequent forward pass the quantities in registers each have at all times a NEXT attribute which allows the oracle to determine which is used the furthest away or not at all. However, to implement this approach, instruction streams must be traversable in a backward direction—that is, the instruction coding must contain overhead for that purpose, or be in fixed length format, or, if blocks of the encoding all read in reverse, the blocks must first be traversed forward to make the backward sequence for traversal. Further, for many secondary storage devices, reading backwards is difficult, and writing the modified instruction stream augmented with the additional NEXT information is even more complex. More important, however, this "distance to next use" stategy does not provide an optimum solution for mixed cost register assignment—where all registers are not available for all register requests at a uniform cost (in time or machine instructions).

One prior art approach to the optimization of register assignements which does not require a backward scan of the instruction stream nor implement a "distance to next use" strategy is suggested by F.R.A. Hopgood, *Compiling Techniques,* American Elsevier, New York, 1969, pp. 96–103—and is named for and based in part on a block replacement algorithm for a virtual storage computer studied by L. A. The Belady, *IBM Systems Journal*, Vol. 5, No. 2, 1966, pp. 86–89.

The Belady algorithm introduces the concepts of "load point", "decision delay", and "complete set" (which concepts are important to an understanding of the method of the present invention) but does not provide for the assignment of unlike subsets of registers.

The prior art (Belady) procedures begins with the registers free. As long as a register is free it may be assigned to the next unique quantity referenced in the instruction stream. When a reference in the instruction stream is to a quantity already in a register an instruction to load that register is not necessary. Once the registers are all in use and another unique quantity is referenced in the instruction stream, a decision delay starts because it is not yet apparent which quantity already assigned to a register should be displaced. The beginning of such a decision delay occurs at a load point. The load point for a quantity is that point in the instruction stream at which the quantity (referred to as a load point quantity) must be inserted into a register—and a load point quantity will enter its register at its load point. However, during a decision delay, which register the load point quantity will enter is not yet determined. Consequently, the load point quantity is remembered, and the scan of the instruction stream continues for the purpose of defining the complete set of $N-1$ (where N is the number of registers) quantities assigned to registers which should not be displaced by the load point quantity. For this purpose, as the serial scan of the instruction stream continues, if a quantity already assigned to a register is referenced (herein, a reuse quantity), the reuse quantity is temporarily disqualified as a candidate for displacement at the load point, as it (the reuse quantity) should be kept in its register to avoid another load instruction in the compiled instruction stream. When $N-1$ reuse quantities have been located in the instruction stream, only one register remains as a candidate to receive the load point quantity. Together with the load point quantity, the $N-1$ reuse quantities (or disqualified quantities) form the complete set of quantities that define the register state at the load point of the load point quantity. Consequently, the appropriate register load and backstore instructions may be inserted in the compiled instruction stream (object code stream). The decision delay has ended.

The manner in which the Belady algorithm handles the situation where the delayed displacement of a quantity in a register to make room for a load point quantity cannot be made before a second load point quantity is referenced in the instruction stream (necessitating a second delayed displacement before $N-1$ reuse quantities have been identified) is not clear from the literature. Nor, as previously mentioned, does the Belady algorithm provide for the "real world" requirement of assigning unlike quantities to different classes, or unlike subsets, of registers, such as anomalous registers, registers reserved for specific purposes, such as, for example when register $\emptyset$ cannot be used to address storage, permanent registers (e.g., registers reserved for use as anchors for addressing path instructions), and global temporary registers (e.g., register assignments required by a prior global optimization pass through the instruction stream). Other classes of registers include coupled registers (e.g., register pairs, or registers consumed two at a time), implicit registers (e.g., Translate and Test result register 1), registers specificed as absolute registers for sections of the instruction stream, and multiple concurrently available registers required for multiple operand instructions.

Further, the register assignment method of a compiling operation, in order to optimize the assignment or registers and, consequently the operation of a computing system under control of the compiled, or executable, instruction stream, should extend the optimization steps across basic blocks of straight line code (such as are defined by branch instructions) and also adjust for the difference in the cost of moving a quantity from one register to another or of moving between a register and storage.

Quantities to be referenced in main storage are accessed in System/370 architecture by specifying a base register and displacement. The base must be in a register to perform the load and store operations previously mentioned for inclusion in the compiled instruction stream to manage the register quantities. Consequently, a register assignment method implemented by a compiler is needed which provides for addressability to quantities in main storage by managing the register contents for the address base quantities in such a manner as to avoid unnecessary load instructions in the compiled code stream.

SUMMARY OF THE INVENTION

It is accordingly an object of this invention to reduce the size and execution time of a compiled code stream. It is a related object to operate a computing system during compilation of a high level instruction stream to assign quantities to registers in a way which reduces the number and/or cost of register load and backstore instructions in the compiled code stream. It is another related object to operate a computing system during execution of a compiled code stream to load and backstore quantities in registers in a manner which reduces execution time.

The above and other objects are satisfied by a method and means by which a computing system is operated upon register requests serially referenced in an instruction stream to assign quantities to registers selected from unlike subsets of registers. During compilation, the register usage of quantities serially scanned in the instruction stream is determined. Upon determining during the serial scan the need for a new quantity to be in a register, the quantity is logged to a queue, or pending set, of load point quantities and assigned a complete set count indicative of the number of registers the quantity requires, plus the number of restricted registers, plus the number of registers in register classes for which it is not a candidate. Upon determining during the serial scan the reuse of a quantity in a register (already assigned or pending assignment), the complete set counts of quantities in the pending set which are candidates for a same register class as the reuse quantity are incremented. When the complete set count for a quantity equals the total number of available registers, a complete set is detected and the quantity is assigned to the remaining register.

In accordance with a further aspect of the invention, the register assignment procedure is recursively executed to generate load instructions for addressability register manipulations conditionally for base address constants not already in a register.

In accordance with still a further aspect of the invention, upon reaching a reference to a favorable label in the input stream, the register assignment procedure services all pending requests for registers irrespective of the complete set count to define a saved register state at the reference to the label. When the label is subsequently reached in the compiled code stream, the register assignment procedure processes pending requests with the saved state inherited if the label is subsequent to an unconditional branch, otherwise the register state is the ordered intersection of the current and saved states. A "favorable" label is one that is referenced only in blocks already scanned. If a label is referenced in a block which will be serially scanned after the label is scanned, the label is "unfavorable" and the register state is undefined (no assigned registers except for permanent or global registers).

BRIEF DESCRIPTION OF THE DRAWINGS

FIGS. 22-35 are flow charts illustrating the method steps executed under control of register assigner 66 of FIG. 1.

DESCRIPTION OF THE PREFERRED EMBODIMENTS(S)

Figure 1:
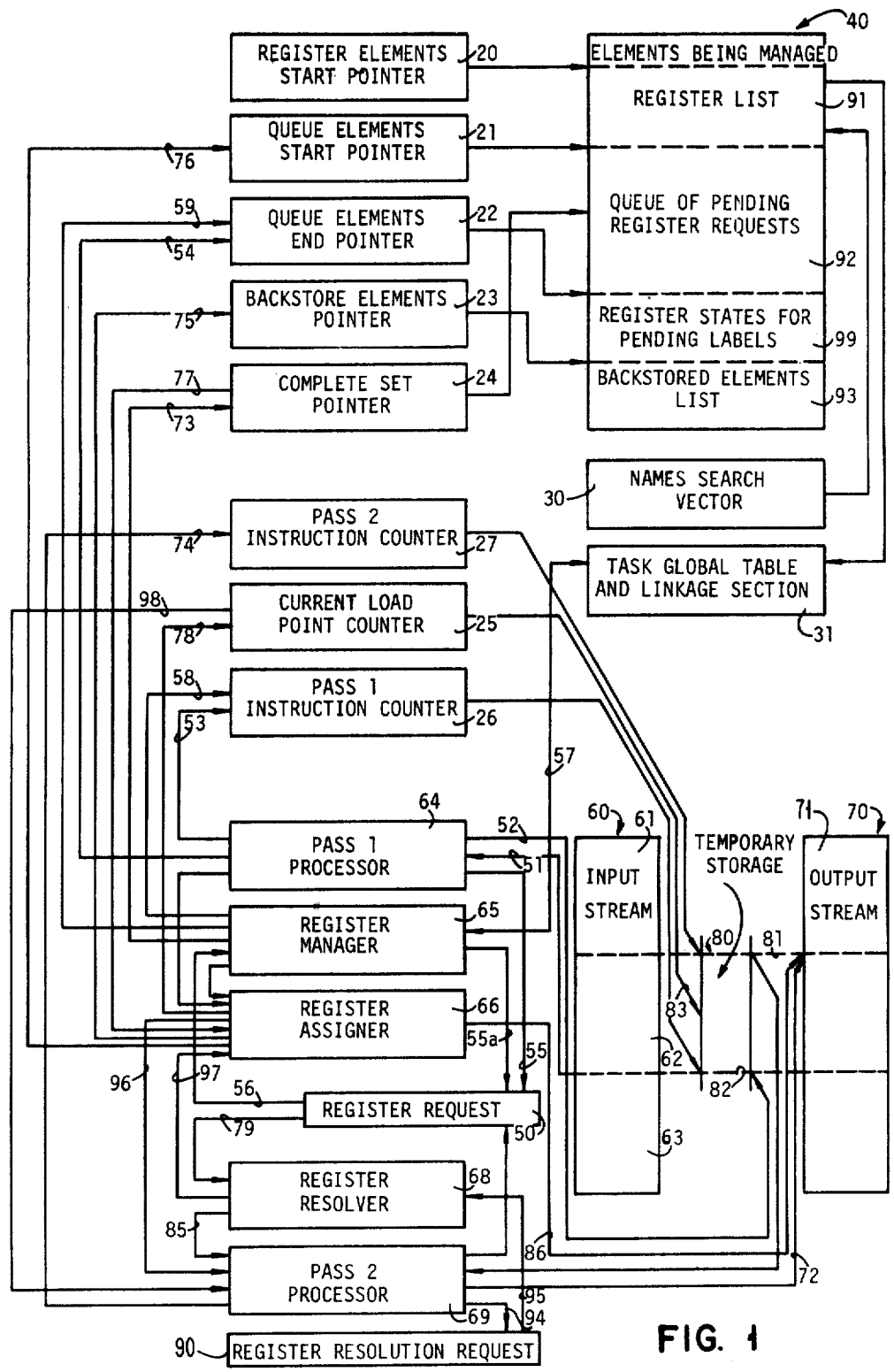
FIG. 1 is a block diagram representation of a portion of a computing system, showing selected system resources managed during the register assignment phase of a compiler.

The machine implementable method of the invention may be more fully appreciated by consideration of the following description of the operation of a computing system such as that described in Amdahl U.S. Pat. No. 3,400,371 during execution of the register assignment phase of a compiler.

In general, the register assignment method of the invention operates a computing system during the register assignment phase of compilation of an instruction stream to generate an output stream of object or executable code (in machine language) for operating a computing system. During the compilation phase, symbolic references to quantities are converted to actual references to machine registers and storage locations, and the register contents managed to store and backstore those quantities so as to substantially improve the execution time and storage space requirements of the object code.

As previously noted, a machine architecture may provide unlike subsets of registers, or subsets of machine registers that are not uniformly assignable quantities. Despite these deviations from a uniform usage of the quantities being managed, the procedure of the invention is applied to a single uniform data structure representing all of the quantities being monitored (thus sharing searching, complete-set discovery and structure maintenance activities) by careful manipulation of the complete set counters for the quantities. The distinction among the various classes of registers is maintained as follows:

(1) The registers are partitioned into disjoint subsets.

(2) A request for a register indicates those sets for which it is a candidate. The value of the complete set counter for the requested quantity is initially set to: the number of registers is disjoint sets for which it is not a candidate, plus the number of quantities that are temporarily restricted, plus the number of quantities consumed by the request itself.

(3) Reuses of quantities are counted only for those pending quantities which are candidates for the same disjoint sets as the reused quantity and the complete set count of the pending quantity is incremented by the number of registers consumed by the reused quantity. A complete set is discovered when the complete set counter reaches the value N, the number of registers available for assignment. (N is the number of elements in register list 91 less the number of registers permanently assigned.) The complete set consists of W registers for the width of the quantity, the number of registers temporarily restricted, the number of registers for which the quantity is not a candidate, plus the number of reuses sufficient to reach N, by the above definition of the initial value of the complete set counter, and the above rules for incrementing the counter. This is a more complete definition of complete set a la Belady, to account for non-uniform register usage. When the register being reused has a width greater than 1, it is possible that the complete set counter would be incremented beyond N. When that condition is detected, the pending quantity is immediately assigned, resulting in the single backstore of the W width quantity. It is as if a register of width W shrunk N to be $N'=N=W+1$. Since the pending quantity has a complete set of at least $N-W+1$, the complete set has been detected (i.e., complete set $\geq N'$).

(4) When a quantity is assigned to a register, the complete set count is recalculated for those pending quantities of which it had been counted as a member, if it is assigned to a register of a class for which the pending member is not a candidate.

For example, a quantity which is a candidate for a System/360 general purpose register is assigned to register ∅. The complete set count for each pending element for which the quantity was a complete set member which cannot use register ∅ is reduced by 1.

(5) Restricted (absolute) registers are treated as normal register requests.

(6) When a complete set is detected it may be necessary to generate instructions to reallocate the contents of registers. Register-to-register transfers are generally cheaper than store and/or load operations, e.g., a System/360 even-odd register is to be assigned and the discardable registers are R3 and R15. Moving the contents of R4 to R15 (or R14 to R3) provides the necessary pair.

(7) In this implementation, the following heuristic is applied to avoid poor assignements when a complete set is not found; this occurs when a label is detected and no complete set for pending assignments exists:

(a) Registers are searched so that the registers likely to be restricted (i.e., 14, 15, 1) and the anomalous register ∅ are at the end of the search order.

(b) The search order (the changing order of register list 91) keeps register pairs (2-3, 4-5, . . . ) adjacent and in even-odd order to facilitate the assignment of register pairs.

(c) Register 11 is not an available register; it is reserved in this implementation as a register for branching.

(d) Registers 12 and 13 are reserved as anchor registers for addressibility calculations to the read-only and invocation local (TGT, etc.) portions, respectively, of the object program. While these registers could be manipulated by the process with no loss of generality as permanently assigned registers, there is computational efficiency to be gained by recognizing them as the addressibility anchor registers. Further, assuming register 15 is to be restricted, registers 14, 15 contain a register pair to be preserved, and R7 is to be discarded, instructions will be generated to move R165 to R7 and to swap R14/R6.

As above described, the method/means of the instant invention performs optimizations within "basic blocks" of instructions. Where branching is "well behaved", (e.g., a target of one or more branches in the instruction stream is reached only from branch instructions earlier in the instruction stream), assignment of registers is extended to those forward blocks. This is the case for code expansion of IF . . . THEN . . . ELSE statements, and CASE statements in high level languages.

This forward assignment of registers across basic blocks is achieved by:

(1) Enqueuing a request to preserve the register state.

(2) When the request is serviced (dequeued), if no previous state exists (prior branch) then saving the state, otherwise forming the ordered intersection of the prior saved state with the current state.

(3) When a label is encountered, servicing pending requests. If the label is subsequent to an unconditional branch (no drop in) then the saved state is inherited; otherwise, the register state is the ordered intersection of the current and saved state.

The method/means of the invention operates on an input stream in which register requests which are direct requests for use of registers for computation must be backstored if displaced, and their last use is marked. Also, for register requests which are direct requests for addressability to storage, the location of the address is known and need not be backstored. These requests may in turn generate requests for addressability to the location of the address, and are handled by recursion. Further, references to labels are marked as being "favorable" (e.g., forward only) or "not favorable", and the definition points of labels are marked "Drop in" or "No Drop in".

Referring now to FIG. 1, a general description of the invention will be given. The input to the register assignment phase of the compiler is a series of instructions read serially from input stream 60. These have, in general, the format shown in FIG. 5, and include the operation code 453 and one or more operands 454, 455, selected operands being in the form of symbolic addresses to quantities which may be assigned to registers. Input stream 60 has previously been through compiler phases which have compiled instructions written in a high level language into machine language—except only that the quantity references are symbolic, and the register load/backstore instructions and addressability computations have yet to be done.

Figure 5:
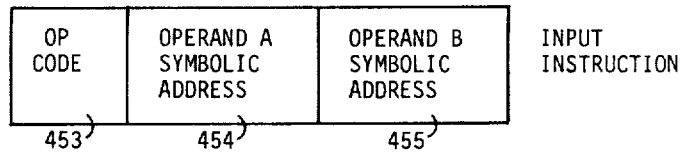
FIG. 5 is a diagrammatic representation of the format of a record in input stream 60 of FIG. 1.
Figure 6:
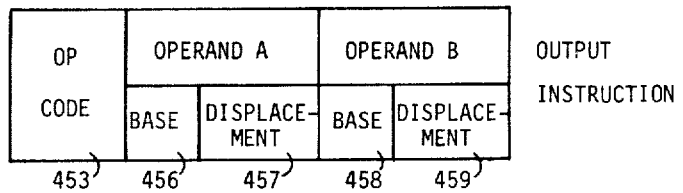
FIG. 6 is a diagrammatic representation of the format of a record in output stream 70 of FIG. 1.
Figure 4:
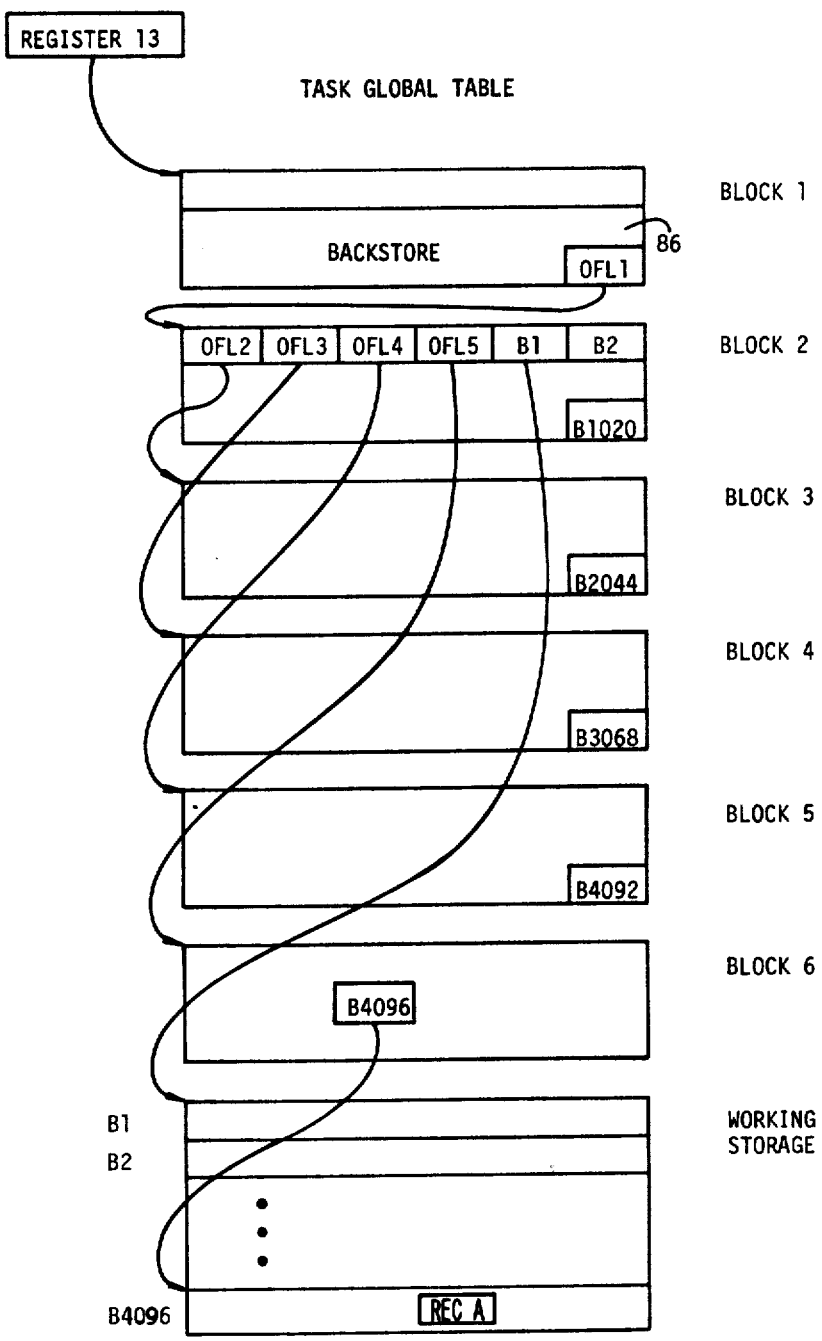
FIG. 4 is a block diagram representation showing additional details of the task global table 31 of FIG. 1.

The output of the register assignment phase of the compiler of FIG. 1 is written into output stream 70, each instruction having a format such as that of FIG. 6—where the symbolic addresses of FIG. 5 have herein been converted to a base 456/displacement 457 format. One or more of the fields 456–459 in FIG. 6 are references to specific machine registers. For each instruction in input stream 60 there is at least one instruction in output stream 70, with additional instructions inserted as needed for register management (load, backstore, etc.) and addressability calculations. By addressability calculations is meant that series of zero or more load instructions required to make accessible in a register the base register address for an operand. (FIG. 4)

Instructions read from input stream 60 are stored in temporary storage 80 until the register state for the instruction is defined, at which time the instruction is removed therefrom and placed in the output stream. In FIG. 1, the last instruction read from input stream 60 is illustrated at location 82, and the next one to be transferred into output stream 70 is illustrated at location 81. Thus, output stream portion 71 corresponds to instructions which have been read from input stream portion 61 and processed through the register assignment phase into object code. Temporary storage 80 corresponds to instructions which have been read from input stream portion 62, but for which the register assignment processing has not been completed, and input stream portion 63 has not yet been read. Address location 81 represents the beginning of temporary storage from which pass 2 processor 69 removes instructions for transfer (72) to output stream 70, and is identified by pass 2 instruction counter 27. Address location 82 represents the next instruction to be read (51) from input stream 60 and transferred to temporary storage 80 by pass 1 processor 64, and is identified by pass 1 instruction counter 26.

Location 83 in temporary storage is designated as the current load point, and is identified by current load point counter 25, as will be more fully described hereafter.

Elements being managed list 40 represents locations in storage which include four chained lists: register list 91, queue of pending register requests 92, backstored elements list 93, and an additional set of chained lists 99, one for the register state of each pending label.

Figure 2:
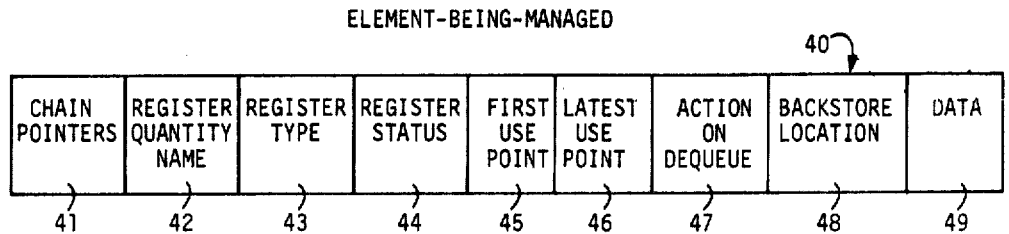
FIG. 2 is a diagrammatic illustration of the format of an individual entry in the Elements Being Managed lists 40 of FIG. 1.

Each element being managed is of the format shown in FIG. 2. Field 41 includes the chain pointers for chaining the records within each chain 91, 92, 93, 94 for scan and storage recovery. Field 42 specifies the register quantity name. Field 43 gives its type, which may be, for example, one of the following: register used for addressing; changed record (redo backstoring); last use encountered; multiple coupled registers; read only register (can be displaced without backstore). Field 44 specifies the register status, which may be, for example: in register; in queue; in backstore; in backstore and in register; free (unallocated) register; global register (not displaceable). Field 45 specifies the first use point, and field 46 at latest use point—both of which will be further described. Field 47 specifies the action to be performed on dequeue; assign the register; generate register load of a read-only quantity; generate register load from backstore. Field 48 gives the location in backstore of a backstored quantity. Field 49 gives certain data, such as: absolute register number, or complete SET count.

Referring now to FIG. 1 in connection with FIG. 2, register elements start pointer 20 points to the first record in register list 91. Queue elements start pointer 21 points to the oldest record in queue of pending register requests 92, and queue elements end pointer 22 points to the newest record in queue 92. Thus, pending queue 92 is organized on a first-in-first-out (FIFO) basis, with register requests queued under control of pointer 22, and dequeued under control pointer 21. Complete set pointer 24 points to the last record in pending requests queue 92 for which a complete set has been identified. Backstore elements pointer 23 points to the first record in backstored elements list 93. Names search vector 30 is accessed, herein, by a hash or binary search algorithm, not part of this invention, for the purpose of locating register quantities in elements being managed lists 40. Backstore elements list 93 includes pointers to locations in backstore 86 where backstored quantities are located at execution time. A record in register list 91 points to the first record in task global table 31, which table will be more fully described hereafter in connection with addressability processing.

Pointers 20-24, counters 25-27, lists 40, and temporary storage 80 are managed under control of the register assignment phase of a compiler—as represented by processor/manager blocks 64-69—to remove partially compiled instructions from input stream 61 location 82, assigne absolute register values to symbolic addresses, and load the compiled instructions into output stream 70 at location 81.

Pass 1 processor, to be more fully described in connection with FIGS. 7-13, reads (51) an instruction from input stream 60 at location 82 defined by counter 26, increments counter 26 (represented by line 53), analyzes the machine language instruction for register references, and passes those register references to register manager 65 as register requests 50, illustrated by paths 55 and 56. Pass 1 processor also enqueues assembler commands and requests to save register states at transfer points (for references to a label) in queue 92, updating end pointer 22 for each such enqueuing, as is represented by line 54.

Register manager 65 determines if a register request 50 is new, or a reuse. If the request is new, and is an addressing register request, manager 65 determines whether a register is required for addressability to the requested quantity. If an addressability register is required, a register request 50 is constructed and register manager 65 is recursively called, as is represented by lines 55a and 56. Register manager 65 enqueues new requests (both original and recursive) in queue 92, updating queue elements end pointer 22, as is represented by line 59, and the first use point 45 (FIG. 2) in the enqueued element being managed is set equal to the pass 1 counter 27. When a request is enqueued in list 92, the action required on dequeue is specified by the register manager. For addressability requests, the action will be to generate a load instruction in the output stream 70. The load instruction itself references an address constant in storage which will, in turn, require a base register. Register manager 65 recursively calls itself with a request for the biasing register 50 for the address constant. For all requests, dequeuing requires the register requests 50 be assigned to actual machine registers. Register manager 65 increments 58 instruction counter 26 to synchronize the output stream 71, and also to identify load instructions inserted for addressability as a load point. This is required as complete set pointer 24 and current load point counter 25 take on the value of pass 1 instruction counter 26 when a load point is encountered in the instruction stream, through taking on the value of first use pointer. The register manager 65, upon enqueuing a request 50, sets data field 49 (FIG. 2) equal to: the number of registers in disjoint sets for which this request is not a candidate, plus the number of registers that are temporarily restricted and in the same set as the request, plus the number of registers consumed by the request itself.

If the register 50 request is for a reuse quantity, then register manager 65 determines by searching backstore elements list 93, register list 91, and queue 92 if the quantity is (a) in backstore, or (b) in a register or pending assignment. If it is in backstore, manager 65 enqueues the request in list 92 with an action on dequeue 47 (FIG. 2) to generate a load instruction in output stream 70 for moving the quantity from backstore to a register at execution time. If the quantity is in a register or pending assignment, register manager 65 adds this reuse as a member of the complete set of all pending elements for which it has not yet been counted as a reuse (that is, in all pending elements where the first use 45 of the pending element is greater than the previous latest use point 46 of this reused quantity). Thie is done by adding the width (number of registers consumed by the reuse quantity) to data field 49 of the appropriate pending quantities. If the addition of the reuse quantity width would cause the complete set count of any pending request to exceed the number of registers available (N), then register manager 65 calls register assigner 66 to service the queue up to and including that pending request. This will cause the reused quantity to be forced into the backstore and subsequently re-enqueued by recursively calling the register manager 65 with the same request. If the addition of the reuse quantity width (the normal case) causes the complete set count of one or more pending quantities to equal N, then complete set pointer 24 is updated (represented by line 73) to reference the latest pending quantity with a complete set. If a complete set has been detected, register manager 65 calls register assigner 66 to service queue 92 up to and including the pending request referenced by complete set pointer 24.

Register assigner 66, when called, services queue 92 up to and including the pending element referenced by complete set pointer 24. Register assigner is called by register manager 65 when a complete set is discovered, or by by pass 1 processor 64 when either a label is encountered in input stream 60 or the end of the input stream 60 is reached. When pass 1 processor 64 calls register assigner 66, the complete set pointer 24 contains a contrived value to force servicing of the entire remaining queue 92. As register assigner 66 services queue 92, it dequeues the top element from the queue (updating accordingly queue element start pointer 21, represented by line 76 and sets current load point counter 25 to the first use point 45 of the dequeued element, as is represented by line 78). For the dequeued element, register assigner 66 first calls pass 2 processor 69 to process all instructions currently in temporary storage 80 up to but excluding the instruction referenced (83) by current load point counter 25. As queue 92 is serviced, action on dequeue 47 is performed, which may require the assignment of a register. An available register is located in register list 91 either because it is marked free in field 44, or because its latest use point 46 is prior to the current load point 25. That available register may contain a quantity which must be backstored by being added to backstore element list 93 with backstore elements pointer 23 updated accordingly. As is represented by control line 86, register assigner 66 adds instructions to output stream 70 to load registers with addressability, to store quantities being displaced to the backstore, and to load quantities into registers from the backstore.

Pass 2 processor 69 reads instructions from storage 80, and for each register reference calls register resolver 68 with register resolution request 90. Register resolver 68 determines the final assignment of the register request to an actual machine register by a search for the register quantity in the current state of the register list 91. The actual register found is returned to the pass 2 processor as represented by line 85 and the actual register number is placed in the instruction. Pass 2 processor 69 then adds the instruction to the output stream 70. Register resolver 68 marks the register free when the reference marked last use is encountered.

FIG. 4 represents the execution time environment, illustrating a Task Global Table (TGT) and Working Storage. The backstore comprises a portion of block 1 of the TGT. When a quantity must be removed from a register under conditions that require that it be saved, it is placed in backstore at a location specified by an address base and displacement: the base is kept in register 13, and points to the beginning of block 1 of the TGT. (Register 13 is reserved solely for the purpose of addressability to the TGT.)

Figure 3:
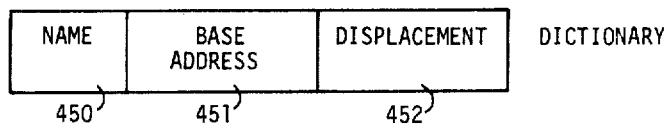
FIG. 3 is a diagramatic representation of the format of an entry in a dictionary of register quantity names.

The instruction stream instructions, during execution time, are referencing data fields in a working storage (for data items used in computations), in a linkage section of storage (for external data passed to this program by a calling program), or in a file section of storage (containing files read from external storage) or a constant generated by the compiler, or, a constant to provide addressability to these areas. In IBM System/360 or IBM System/370 architecture, a symbolic operand name in the source program represents a field in the virtual storage of the executing program. During compilation, that symbolic operand is converted to machine language base/displacement—where the base must be an address in a register. A dictionary comprising a plurality of dictionary records 30 (see FIG. 3) provides for each symbolic quantity 450, base address 451 and displacement 452—specifying that quantity 450 is governed by base address 451, and within the block governed by base address 451 at a displacement 452. During compilation, a symbolic reference in an instruction in instruction stream 60 must be converted to the base, or succession of base registers required to access the data. That succession of base registers was determined by register manager 65 and resulted in enqueuing instruction load requests in queue 92.

In generating instructions to load registers with addressability, the base register of the address constant must be resolved. Register assigner 66 invokes register resolver 68 with a register resolution request 90 as represented by line 96. Register resolver 68 returns the actual register number to register assigner 66 as represented by line 97.

As an example, to address 16 million bytes of working storage, a Task Global Table (TGT) of 4096 address constants is required, each address constant (B1, B2, . . . B4096) pointing to a unique block in working storage, as illustrated in FIG. 4. With backstore located in block 1 of the TGT, and 4096 address/constants to be stored, beginning in block 2, a six block (each block equals 4096 bytes, with each record being 4 bytes, for 1024 records per block) TGT is required. Consequently, overflow records OFL 1, OFL 2, . . . , OFL 5 are used to link together the TGT blocks, with register 13 reserved for a pointer to the start of block 1 of the TGT.

By way of a more specific example, when access is made to a record residing in block B4096 of working storage (as determined from dictionary 30 field 451), the following addressability computations are required, and load register instructions required in output 70 for addressability (to place base address in a register). Assume the source statement (FIG. 5) is:

MOVE A to . . .

The corresponding object, or IBM System/360 language statement is:

MVC . . . , A

Figure 19:
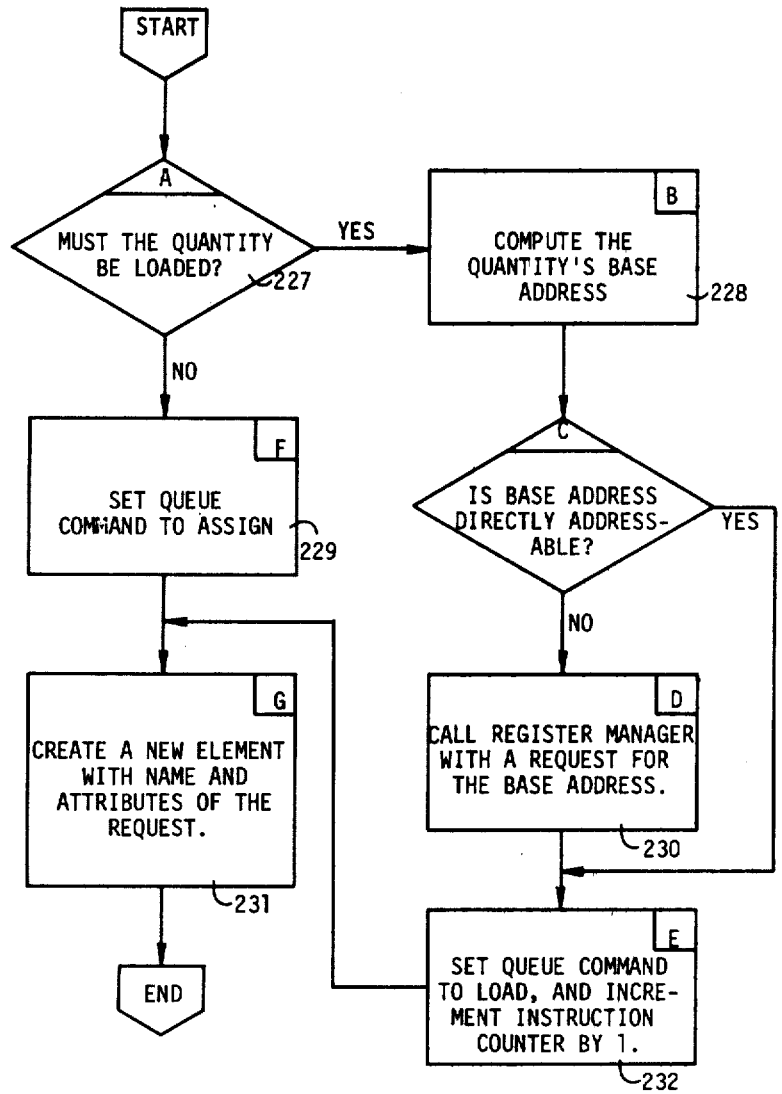

This requires that the base address of record A be in a register, which in turn will require the following load instructions (in the order of their appearance in output stream 70, which is in the reverse order of the detected need for their generation during the recursive addressability computations required by FIG. 19, steps 227-232, discussed infra):

(1) L Rw, 4092 (13)

where Rw represents one of registers managed in list 91, 13 represents absolute register 13, 4092 represents the displacement to overflow record OFL 1 in the block addressed by register 13. (4092 is the address of the last 4 byte record in a block of 4096 bytes, or 1024 records.)

(2) L Rz, 12 (Rw)

where Rz represents another one of the registers managed in list 91, 12 represents the displacement in block 2 to record OFL 5.

(3) L Rx, 12 (Rz)

where Rx represents another one of the registers managed in list 91, 12 represents displacement in block 6 to record B4096. With this series of load instructions, anchored to register 13, register Rx is loaded within the base address (address constant) of the block (B4096) in working storage containing record A:

MVC . . . , A (Rx)

Potentially, three load instructions are required for addressability. According to the invention, addressability computations are integrated into the register assignment procedure to avoid the necessity of unconditionally generating all three instructions when a quantity already exists in a register. According to the invention, therefore, register manipulation instructions (load) are conditionally generated, being required only for quantities not already in registers—which can only be determined dynamically at the time of register allocation by the state of the registers.

Referring now to the flow diagrams of FIGS. 7-39, the method of operating a computing system according to the invention will be described in connection with psuedo code representations thereof set forth in tables 1 through 14. As will be apparent to those skilled in the art, the psuedo code representation can be converted without undue experimentation to a compilable language of a programmer's choice. On the other hand, to set forth a complete source or object code statement of the invention would obscure it in a prolixity of unnecessary detail.

Pass 1 Processor

Referring to FIGS. 7-13 in connection with Tables 1-5, the operation of the computing system under control of pass 1 processor 64 of FIG. 1 will be described.

Figure 7:
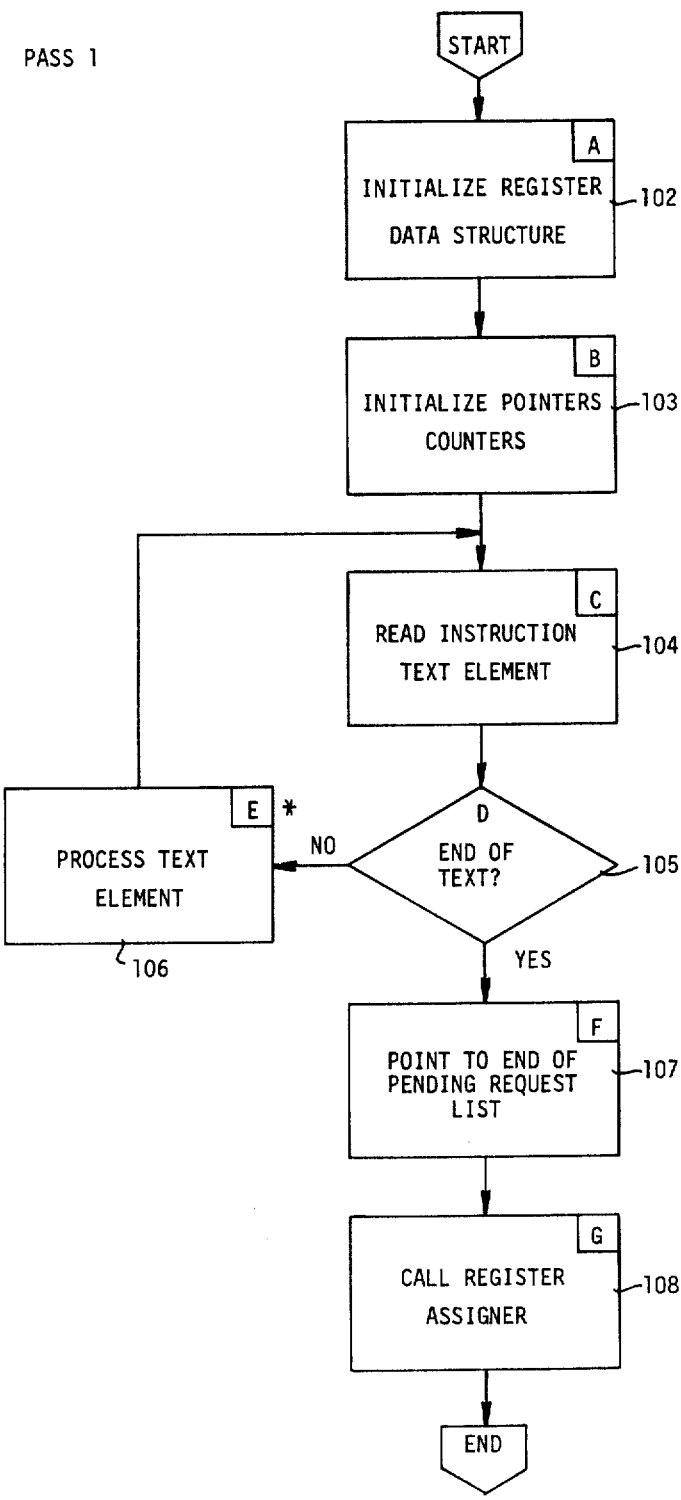
FIG. 7-13 are flow charts illustrating the method steps executed under control of pass 1 processor 64 of FIG. 1.

Previous to entering pass 1 procedure of FIG. 7, the source code has been compiled into machine language code input stream 60 of the format of FIG. 5, with all register references still symbolic, there being as yet no addressability to data. Labels in instruction stream 60 have been previously characterized as "well behaved" or the opposite, and "drop in" or the opposite. Also, the definition point and any redefinition point (for backstore management) and the last use of each symbolic register is indicated for each symbolic register reference, and the maximum size required for the backstore has been calculated.

In step 102, register elements start pointer 20 is initialized to point to the first element being managed 40, and the chain pointers 41 are initialized to chain together elements 40. Herein, for the register architecture of the IBM System/370, thirteen elements 40 are chained into register list 91, with the register number stored in data field 49, and each register element 40 marked with a free status indication in register status field 44. In this implementation, the number of global registers is reduced by the number of registers which are permanently assigned. Permanent registers are made permanent by storing the register name in register quantity name field 42, with "in register" and "global register" status in register status field 44, and the register name 450 added to names search vector 30.

In step 103, pointers and counters 21-27 are initialized to null. Processing of text elements 60 begins in step 104.

Processing of text elements step 106 (which is expanded in FIG. 8) continues until the end of text stream 60 is reached, whereupon in step 107 the complete-set-pointer 24 is set to point past end of pending requests queue 92 to assure that in step 108 register assigner 66 will assign to registers the elements remaining in queue 92 and thus terminate the register assignment process.

Figure 8:
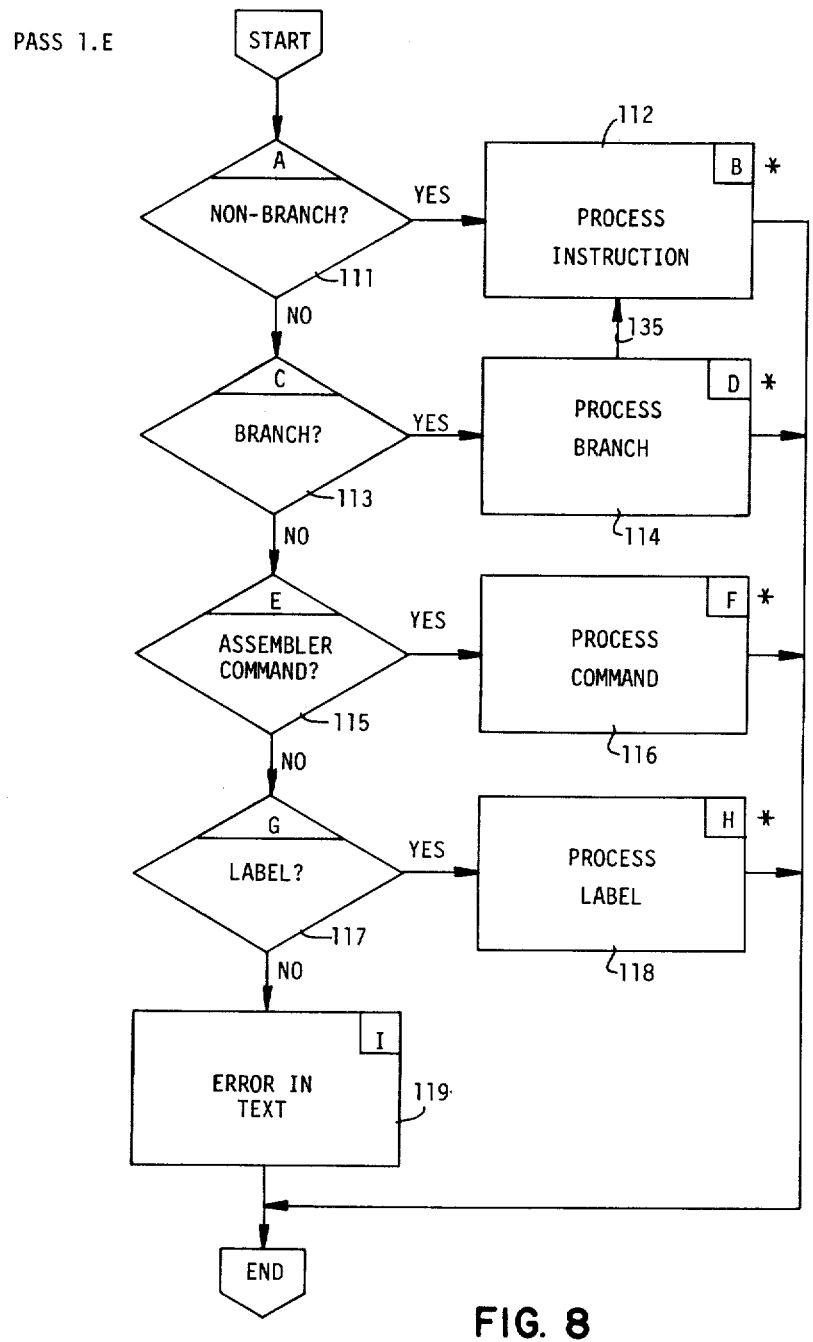

In FIG. 8 is shown in greater detail the process-text-element step 106 of FIG. 7. In steps 111, 113, 115, 117 a determination is made of the procedure 112, 114, 116, 118 to be followed in processing the input stream element 60.

The psuedo code representation for FIGS. 7 and 8 of pass 1 processor 64 is set forth in Table 1. In each of Tables 1-14, the left most column of numbers references the flow chart blocks of FIGS. 7-39. The right most column gives the code listing line number.

TABLE 1

| | Pass 1 Procedure | |
|---|---|---|
| 100 | PASS 1 PROCEDURE | 00003 |
| 102 | INITIALIZE elements-being-managed list to the number and types | 00005 |
| | of registers being managed | 00006 |
| | * note that this is where decisions are made on assignment of | * 00008 |
| | * permanent registers. | * 00009 |
| | * | * 00010 |
| | * for convenience the registers are arranged as even followed | * 00011 |
| | * by odd of register pairs. | * 00012 |
| 103 | INITIALIZE pointers and counters | 00014 |
| 104 | READ the intermediate text | 00016 |
| 105 | DO WHILE not end of file | 00018 |
| 106 | CASE (text type) | 00020 |
| 111 | WHEN (text is a non-branch instruction) | 00022 |
| 112 | CALL Process-Instruction | 00023 |
| 113 | WHEN (text is a branch instruction) | 00025 |
| 114 | CALL Process-Branch | 00026 |
| 115 | WHEN (text is an Assembler command) | 00028 |
| 116 | CALL Assembler-Commands | 00029 |
| 117 | WHEN (text is a label) | 00031 |
| 118 | CALL Process-Label | 00032 |
| 119 | WHEN OTHER | 00034 |
| | ABORT * invalid instruction type * | 00035 |
| 120 | END CASE | 00037 |
| 104 | READ the intermediate text | 00039 |
| 105 | END | 00041 |
| 107 | SET complete-set-point to past end of queue | 00043 |
| 108 | CALL Register-Assigner (complete-set-point) | 00044 |

Figure 9:
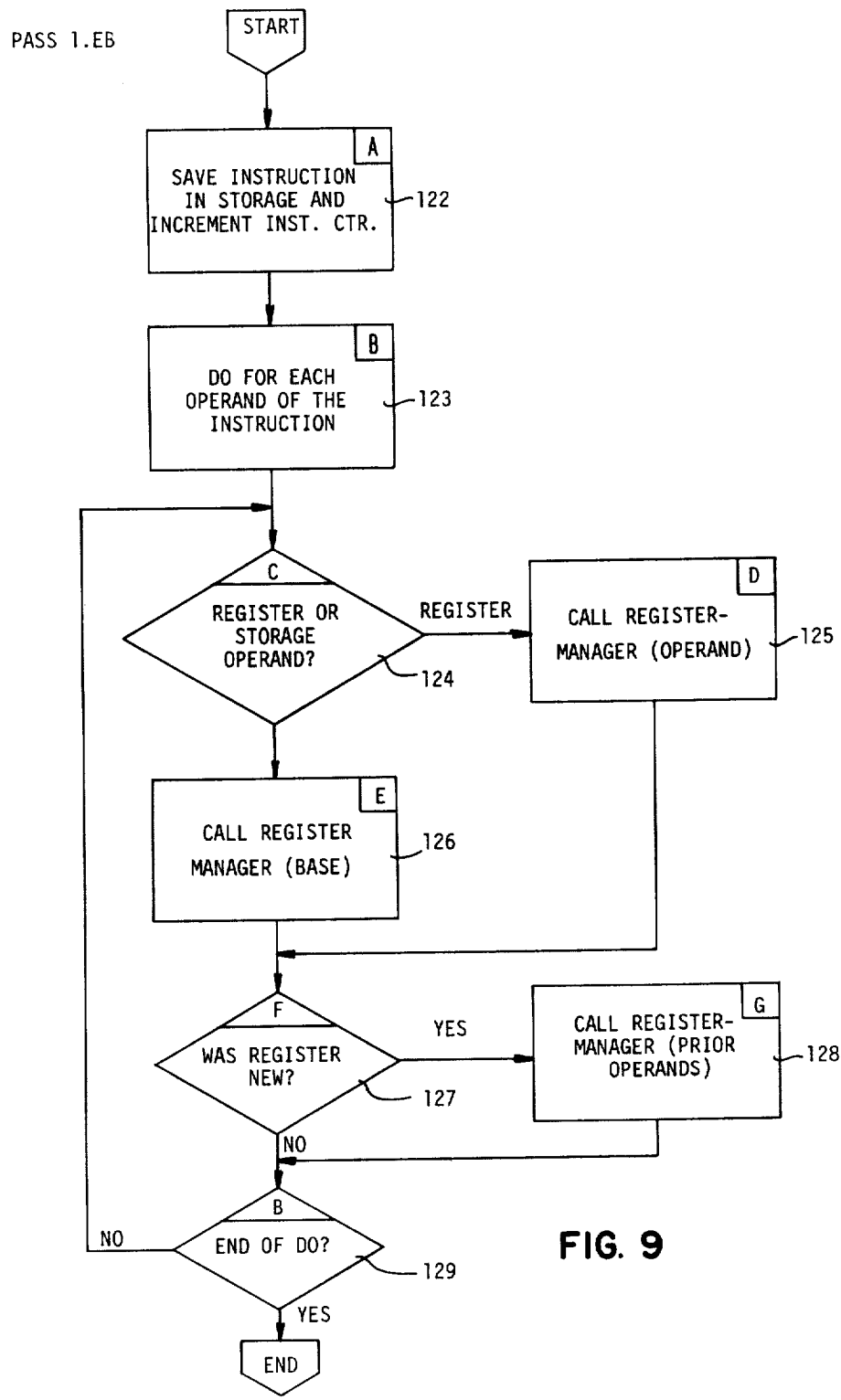

In FIG. 9 and Table 2 is set forth in greater detail the operation of the pass 1 process instruction step 112 of FIG. 8.

TABLE 2

| | Process Instruction Procedure | |
|---|---|---|
| 121 | Process-Instruction PROCEDURE | 00046 |
| 122 | SAVE the instruction in storage | 00048 |
| | SET the instruction-counter up by 1 | 00049 |
| 123 | DO for each operand | 00051 |
| 124 | IF the operand is a register | 00053 |
| | THEN | 00054 |
| 125 | CALL Register-Manager (Register Operand) | 00055 |
| | OTHERWISE | 00056 |
| 126 | COMPUTE its basing-register-value | 00057 |
| | MARK the request "READ ONLY" and "ADDRESSING" | 00058 |
| | CALL Register-Manager (basing-register-value) | 00059 |

TABLE 2-continued

| | Process Instruction Procedure | |
|---|---|---|
| | FI | 00060 |
| 127 | IF the Request was "NEW" | 00062 |
| | THEN | 00063 |
| 128 | DO for all prior requests in this instruction | 00064 |
| | CALL Register-Manager (prior request) | 00065 |
| | * this causes prior requests to be in the complete set | * 00066 |
| | * of the new reference and assures concurrency | * 00067 |
| | END | 00068 |
| | FI | 00069 |
| 129 | END | 00071 |
| 130 | END Process-Instruction | 00073 |

In step 122, the instruction (FIG. 5) from input stream 60 is added to temporary storage 80, and instruction counter 26 incremented to point to it, at location 82. Each operand 454, 455, etc. of the instruction is then processed (step 123) through steps 124-129.

If the operand request is a register, in step 125 register manager 65 is called via a register request 50, with the operand as the request argument. If the input stream 60 instruction operand is a storage (not register) operand, then the basing register value is computed and register manager 65 is called in step 126 with the basing register name as the argument of request 50.

When an instruction includes a plurality of register assignment requests, and this request is for a new register, then in steps 127, 128 register manager 65 is called to force prior requests within the same instruction to be included within the complete set of this request. Assume, by way of example, an instruction requiring that first A and then B be in registers. In step 127, if B is a request for a new quantity, then step 128 follows. If B is not new, then B is a reuse, and B is in A's complete set. A, then, was either a new or reuse request. If A was new, it is pending and B is a member of its complete set. If A was reused, then A is either pending or in a register. If A is pending, then B is a member of its complete set. If A is in a register, then both A and B are members of the complete set of some pending element. For an element in a register, there is no complete set—also, an element will not be displaced from a register until the current load point 25 is beyond the latest use 46. Thus, by steps 127, 128, it is assured that all register requests in a single instruction will either be in registers or members of each others complete sets.

Figure 10:
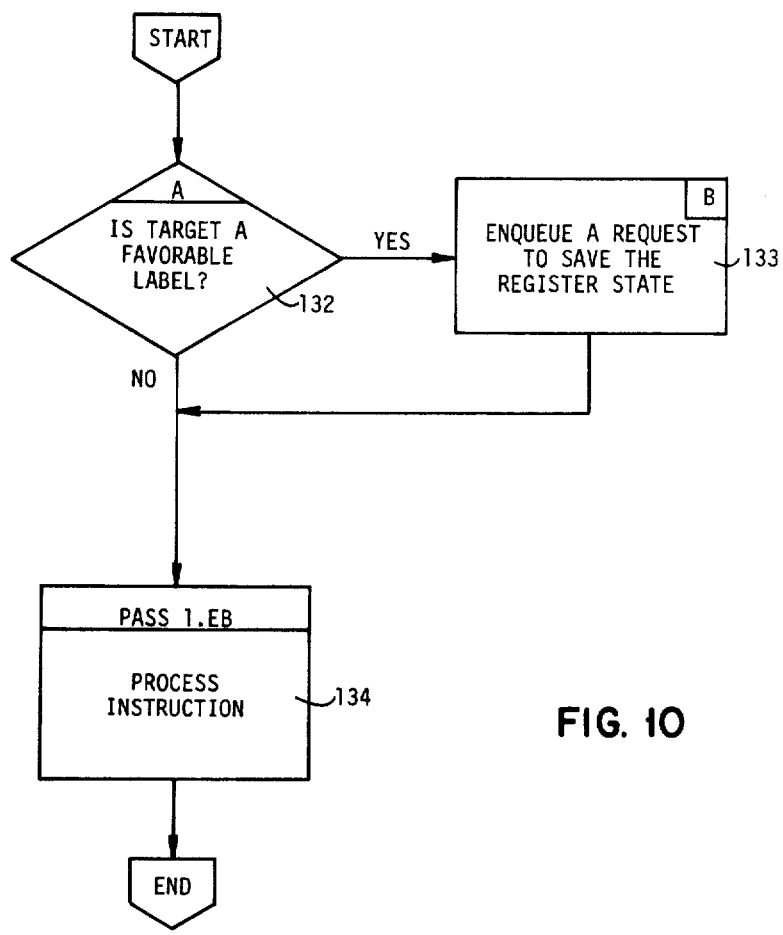

In FIG. 10 and Table 3 is set forth the process branch of step 114. In step 132 it is determined that the target of the branch instruction is to a favorable label.

TABLE 3

| | Process Branch | |
|---|---|---|
| 131 | Process-Branch PROCEDURE | 00075 |
| 132 | IF the target of the branch is favorable | 00077 |
| 133 | THEN | 00078 |
| | ENQUEUE a request to save the register state | 00079 |
| | FI | 00080 |
| 134 | CALL Process-Instruction (with branch instruction) | 00082 |
| 135 | END Process-Branch | 00084 |

A favorable label is one which is branched to only from instructions appearing earlier in the code stream (which is determined from an earlier pass through the stream). If a label is favorable ("well behaved") then the ordered intersection of the totality of all possible register states can be calculated, and "inherited" at that label to extend the algorithm beyond basic blocks. The request is enqueued so that it will be processed after currently pending assignments have been processed (only then is the register state at the branch known).

On the other hand, if the label is not "well behaved" then certain possible states have not been seen and recorded and the ordered intersection of the totality of register states cannot be calculated, therefore the state of all registers must be made free and inheritance cannot occur. In step 134, process instruction (FIG. 9) is called.

Figure 11:
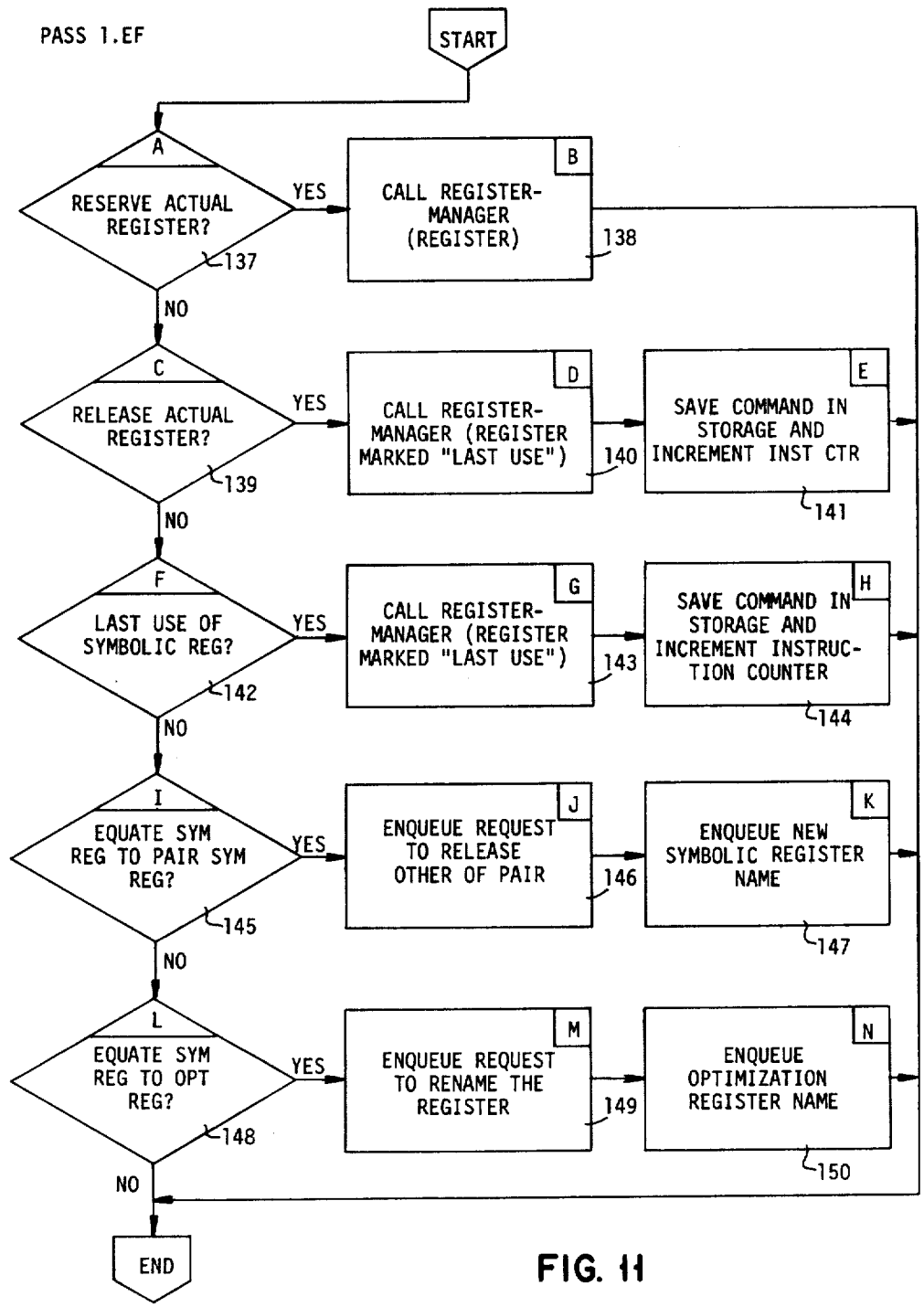

In FIG. 11 and Table 4 is set forth the process assembler command of step 115, FIG. 8.

TABLE 4

| | Assembler Command | |
|---|---|---|
| 136 | Assembler-Command PROCEDURE | 00086 |
| | CASE (type of command) | 00088 |
| 137 | WHEN (command is to reserve an actual register) | 00090 |
| 138 | CALL Register-Manager (Register to reserve) | 00091 |
| 139 | WHEN (command is to release an actual register) | 00093 |
| 140 | CALL Register-Manager | 00094 |
| | (Register to be released marked "LAST USE") | 00095 |
| 141 | SAVE command in storage | 00096 |
| | SET Instruction-counter up by 1 | 00097 |
| 142 | WHEN (command marks last use of a symbolic register) | 00099 |
| 143 | CALL Register-Manager | 00100 |
| | (Symbolic Register marked "LAST USE") | 00101 |
| 144 | SAVE command in storage | 00102 |
| | SET Instruction-counter up by 1 | 00103 |
| 145 | WHEN (command equates symbolic register to | 00105 |
| | one of a register pair symbolic register) | 00106 |
| 146 | ENQUEUE a request to release the other of the pair | 00107 |
| 147 | ENQUEUE a request for the new symbolic register | 00108 |
| 148 | WHEN (command equates an optimization register to | 00110 |
| | a symbolic register) | 00111 |
| 149 | ENQUEUE a request to equate the symbolic register | 00112 |
| 150 | ENQUEUE a request for the new optimization register | 00113 |
| | END CASE | 00115 |

TABLE 4-continued

| Assembler Command | |
|---|---|
| END Assembler-Command | 00117 |

In steps 137, 138, if the assembler command is to reserve an actual register, register manager 65 is called to increase by one the number of restricted registers.

In steps 139-141, register manager 65 is called to release an actual register, decrementing by one the count of restricted registers and marking field 46 with latest use. The command is stored in storage 80, and instruction counter 26 incremented to point to the new location 82, for subsequent use by pass 2 process 69— which must know when to remove the usage of the register from elements being managed list 40 by setting field 44 to free status, and field 42 to null.

Steps 142-144 process a command marking the last use of a symbolic register, steps 145-147 process a command equating a symbolic register to one of a register pair symbolic register, and steps 148-150 a command equating an optimization register to a symbolic register. Enqueuing steps 146, 147, 149, 150 add elements to queue 92, which is processed first-in-first-out (FIFO). Steps 139-144 handle the special situation where the code generator (input to input stream 60) could not mark the last use in the instruction.

Figure 12:
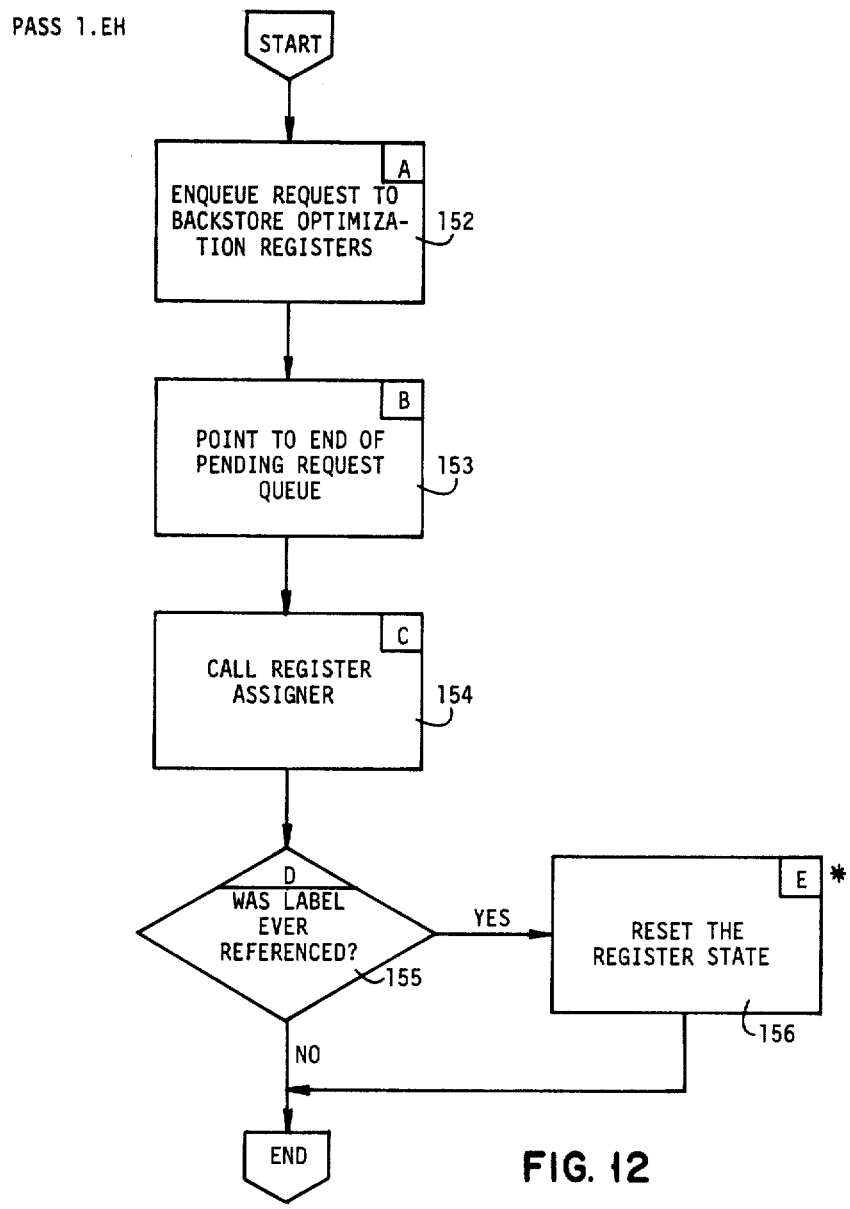
Figure 13:
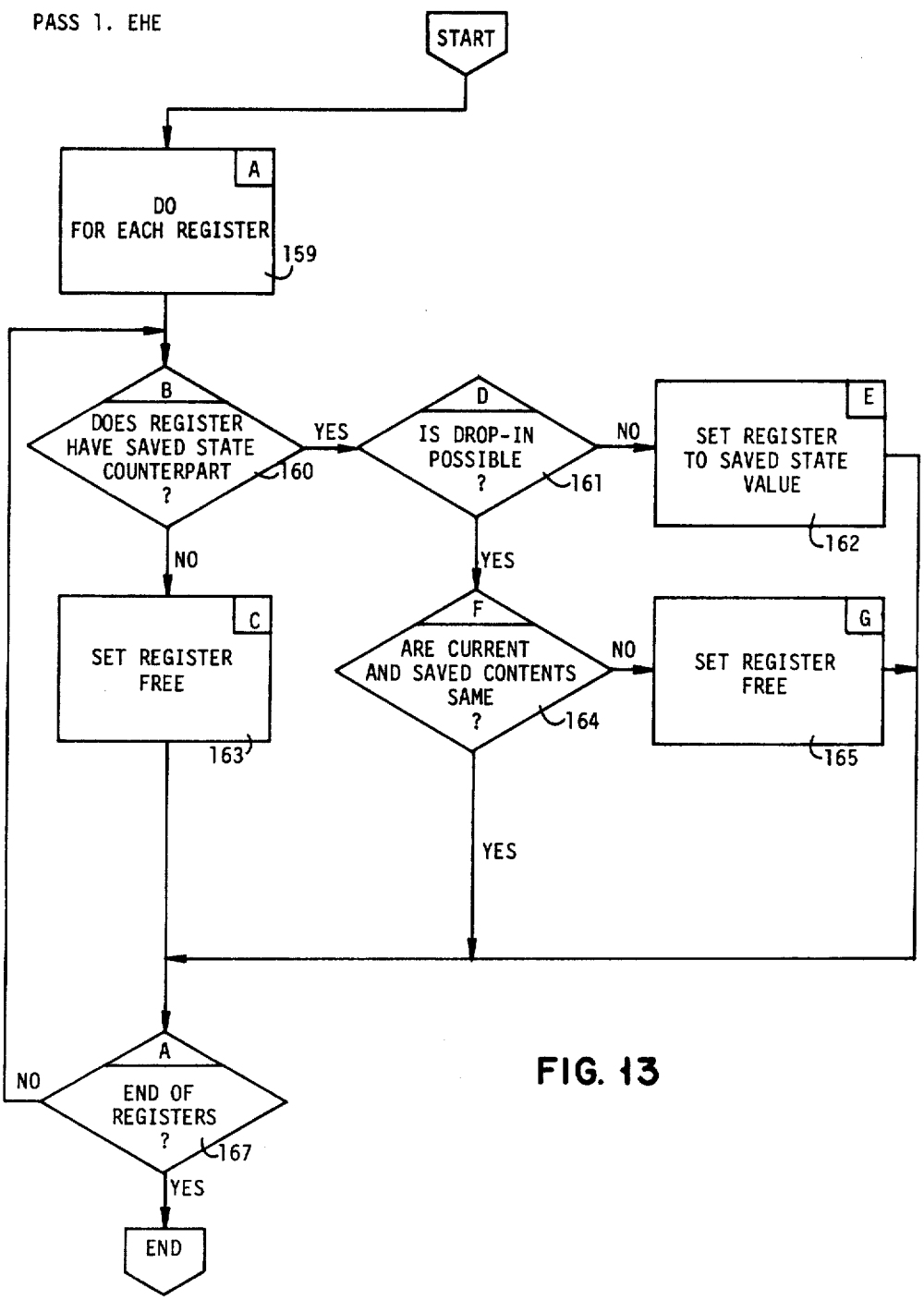
Figure 14:
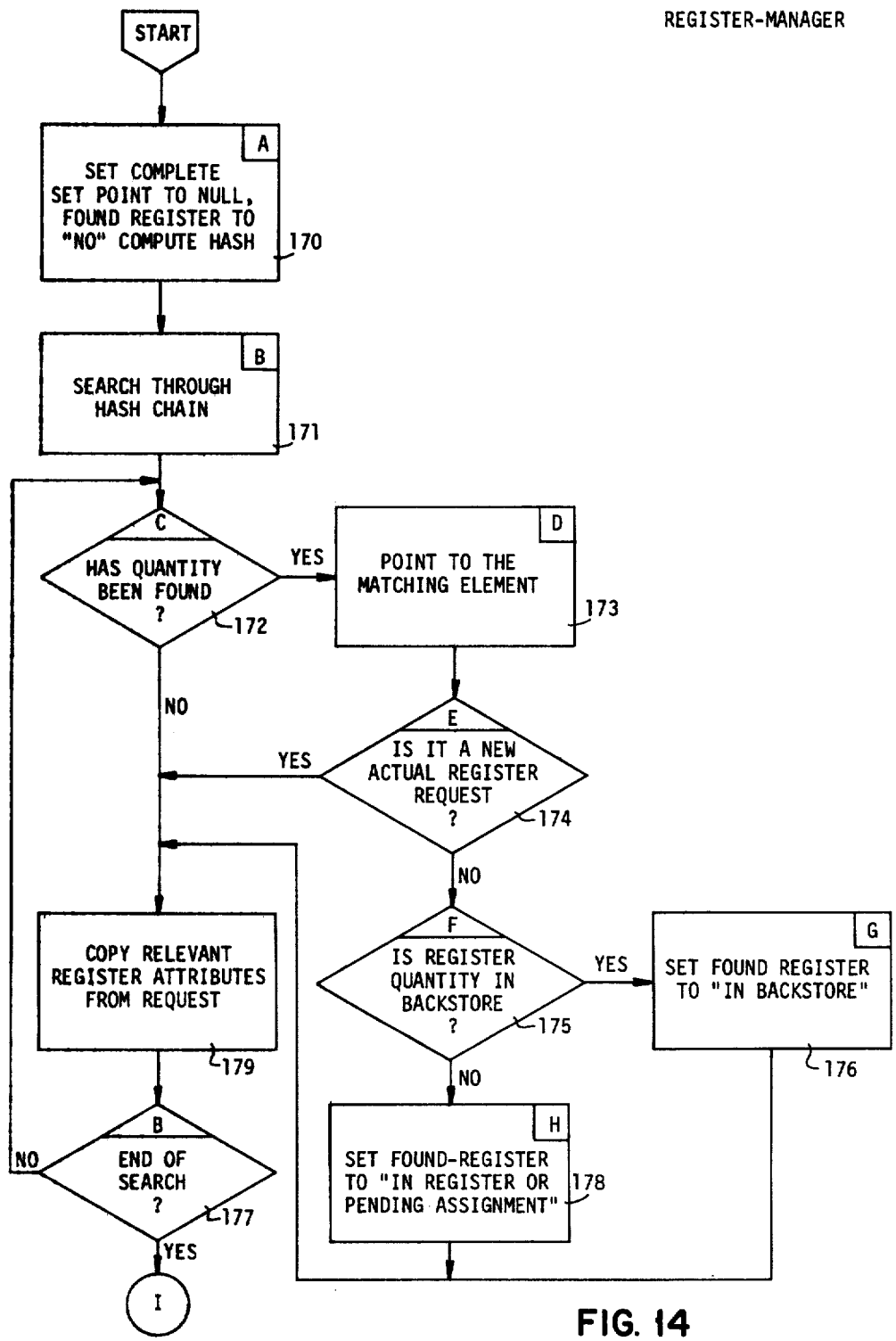
FIG. 14-21 are flow charts illustrating the method steps executed under control of register manager 65 of FIG. 1.

In FIGS. 12 and 13 and Table 5 is set forth the process label procedure of step 118 (FIG. 8).

during register assigner 66 processing) to assure that, regardless of the path by which the label is reached, copies of optimization registers exist in backstore. In order to resolve all pending requests, complete set pointer 24 is set to the end of pending queue 92 in step 153, and register assigner 66 called in step 154.

When the label is referenced, steps 155, 156 (FIG. 12) and FIG. 13 reset the register state. Each register which has no counterpart in the saved state (in backstore 93), as a result of the processing of enqueued requests to save the register by register assigner 66, has its register state field 44 set to the free state. However, if a counterpart register exists in the saved state (in backstore 93) and if drop in is possible (that is, the label can be reached without a prior branch; that is, from the previous instruction in the instruction stream), steps 164, 165 set free registers where the saved contents are not the same as the current register. If drop in is not possible, the register is set to the saved state value in step 162.

Step 109 (Table 5) ends the pass 1 procedure, which begins at step 100 (Table 1).

Register Manager

In FIGS. 14-21 is set forth the steps executed by register manager 65, with Tables 6-8 containing the corresponding psuedo code description.

TABLE 5

| | Process Label | |
|---|---|---|
| 151 | Process-Label PROCEDURE | 00119 |
| 152 | ENQUEUE a request to backstore optimization registers | 00121 |
| 153 | SET complete-set-point to past the end of the queue | 00122 |
| 154 | CALL Register-Assigner (complete-set-point) | 00123 |
| 155 | IF the label is referenced | 00124 |
| 158 | THEN | 00125 |
| | IF the label has a saved register state | 00126 |
| | THEN | 00127 |
| 159 | DC for each register | 00128 |
| 160 | IF the register does not have a counterpart in the | 00129 |
| | saved state | 00130 |
| 163 | THEN | 00131 |
| | FREE the register | 00132 |
| | OTHERWISE | 00133 |
| 161 | IF Dropin is possible | 00134 |
| | THEN | 00135 |
| 164 | IF the current and saved quantity are not the same | 00136 |
| 165 | THEN | 00137 |
| | FREE the register | 00138 |
| 162 | FI | 00139 |
| | OTHERWISE | 00140 |
| | SET the value of the register to the saved state | 00141 |
| | FI | 00142 |
| | FI | 00143 |
| 167 | END | 00144 |
| | FI | 00145 |
| | FI | 00146 |
| 168 | END Process-Label | 00147 |
| 109 | END PASS1 | 00149 |

When a favorable label is encountered in input stream 60, a request is enqueued in queue 92 by step 152 to backstore optimization registers (which will be done

TABLE 6

| | Register Manager - Part 1 | |
|---|---|---|
| | A.2.2 REGISTER-MANAGER | SMEZSH3 |
| | Register-Manager Procedure with argument (register-request) | 00002 |
| 170 | SFT complete-set-point to queue-elements-start | 00004 |
| | SET found-register to "NO" | 00005 |
| | HASH the name of the register request | 00007 |
| 171 | SEARCH elements-being-managed | 00008 |
| | beginning with names-search-vector of hash | 00009 |

TABLE 6-continued

Register Manager - Part 1

| | | |
|---|---|---|
| | along the hash chain | 00010 |
| 172 | WHEN name of element-being-managed is equal to | 00011 |
| | name of register-request | 00012 |
| 173 | SET basing pointer for element to current element-being-managed | 00013 |
| 174 | IF the quantity is an absolute register AND | 00014 |
| | its prior occurence is marked "LAST USE" | 00015 |
| | THEN * this is a new restriction of the register * | 00016 |
| | * and it will be put in the queue * | 00017 |
| | OTHERWISE | 00018 |
| 175 | IF register quantity is in the backstore | 00019 |
| 176 | THEN | 00020 |
| | SET found-register to "IN BACKSTORE" | 00021 |
| 178 | OTHERWISE | 00022 |
| | SET found-register to "IN REGISTER OR PENDING ASSIGNMENT" | 00023 |
| | FI | 00024 |
| | FI | 00025 |
| 179 | IF this request causes the quantity to become active | 00027 |
| | THEN | 00028 |
| | SET its status to "ACTIVE" | 00029 |
| | FI | 00030 |
| | IF this request is marked as the last use of the quantity | 00032 |
| | THEN | 00033 |
| | SET its status to "LAST USE" | 00034 |
| | FI | 00035 |
| 177 | END SEARCH | 00036 |

Referring to FIGS. 14-21 in connection with Tables 6-8, register manager 65, inter alia, enqueues new requests in queue 92, together with instructions on the action to be taken upon dequeue. It also tests for complete sets, and when found, calls register assigner 66.

When called, such as from pass 1 processor 64 or by recursion from itself, register manager 65 initializes complete set printer 24 in step 170 to point to the beginning of the pending register requests queue 92, and computes the hash value of the symbolic register name. With that hash value, in steps 171, 172, 177, the names-search-vector 30 is searched to find the pointer in vector 30 to the matching element in elements-being-managed list 40. In steps 174-179, the location of the found register is identified and logged.

TABLE 7

Register Manager - Part 2

| | | |
|---|---|---|
| 181 | IF found-register is "IN REGISTER OR PENDING ASSIGNMENT" | 00038 |
| 182 | THEN | 00039 |
| 188 | IF the register is not permanently assigned | 00040 |
| | THEN | 00041 |
| 189 | IF this request is for an absolute register | 00042 |
| | THEN | 00043 |
| 190 | IF it is marked last use | 00044 |
| 191 | SET the number of restricted registers down by 1 | 00045 |
| | FI | 00046 |
| 193 | IF the register is 0 | 00047 |
| | THEN | 00048 |
| 195 | SET register-0-restricted to 0 | 00049 |
| | FI | 00050 |
| 192 | OTHERWISE | 00051 |
| | * this is a reuse of the register and the complete set * | 00052 |
| | * count of all quantities pending must be updated * | 00053 |
| 197 | IF the element is on the queue | 00054 |
| | THEN | 00055 |
| 198 | SET start-point to the next element in the queue | 00056 |
| | OTHERWISE * It is in a register * | 00057 |
| 199 | SET start-point to the queue-elements-start | 00058 |
| 200 | IF the register is register 0 | 00059 |
| | THEN | 00060 |
| 201 | SET register-0-flag to "YES" | 00061 |
| | FI | 00062 |
| | FI | 00063 |
| 202 | IF the current request is for a register pair | 00065 |
| | THEN | 00066 |
| 203 | SET register-size to 2 | 00067 |
| | OTHERWISE | 00068 |
| 204 | SET register-size to 1 | 00069 |
| | FI | 00070 |
| 213 | DC from start-point to queue-elements-end using pointer | 00072 |
| 214 | IF pointer → first-use-point of element is greater than the | 00074 |
| | last-used-point of the element being reused | 00075 |
| | THEN * this reuse may be a member of the pending * | 00076 |
| | * element's complete SET * | 00077 |
| 215 | IF pointer → complete-set-count + register-size | 00078 |
| | is greater than the number of registers | 00079 |
| | THEN | 00080 |
| 216 | SET complete-set-point to the successor of this element | 00081 |

TABLE 7-continued

| | Register Manager - Part 2 | |
|---|---|---|
| | CALL Register-Assigner | 00082 |
| | * restart register management * | 00083 |
| 217 | CALL Register-Manager (Register Request) | 00084 |
| 218 | RETURN | 00085 |
| | FI | 00086 |
| 219 | IF pointer → element cannot use register 0 AND | 00087 |
| | the quantity being reused is register 0 | 00088 |
| | THEN | 00089 |
| 220 | SET the pointer → complete-set-count of the element | 00090 |
| | up by register-size - 1 | 00091 |
| | OTHERWISE | 00092 |
| 221 | SET the pointer → complete-set-count of the element | 00093 |
| | up by register-size | 00094 |
| | FI | 00095 |
| 222 | IF the complete-set-count of this element is equal to the | 00097 |
| | number of registers | 00098 |
| | THEN * we have discovered a resolution point * | 00099 |
| 223 | SET complete-set-point to the successor of this element | 00100 |
| | FI | 00101 |
| | FI | 00103 |
| 224 | END | 00104 |
| 208 | IF the complete-set-point is not queue-elements-start | 00106 |
| | THEN | 00107 |
| 209 | CALL Registet-Assigner (complete-set-point) | 00108 |
| | FI | 00109 |
| | FI | 00111 |
| 194 | SET the last-used-point of the quantity being reused | 00113 |
| | to the instruction-counter | 00114 |
| | FI | 00115 |

TABLE 8

| | Register Manager - Part 3 | |
|---|---|---|
| 183 | OTHERWISE | 00117 |
| | IF found-register is "NO" | 00118 |
| 184 | THEN | 00119 |
| 227 | IF the register-request is of a type that requires a register | 00120 |
| | load instruction | 00121 |
| | THEN | 00122 |
| | * recursively call this routine to force its basing register * | 00123 |
| | * to be assigned * | 00124 |
| 228 | COMPUTE its basing-register-value | 00125 |
| 230 | CALL Register-Manager (basing-register-value) | 00126 |
| 232 | SET queue-command to "LOAD" | 00127 |
| | OTHERWISE | 00128 |
| 229 | SET the queue-command to "ASSIGN" | 00129 |
| | FI | 00130 |
| 231 | CREATE a new elements-being-managed entry with the attributes | 00131 |
| | of the register request and the command type set above | 00132 |
| | and add the quantity to the names-search-vector | 00133 |
| 185 | OTHERWISE * the quantity is in the backstore * | 00134 |
| | DEQUEUE it from the backstore list and add the attribute | 00135 |
| | "BACKSTORED" | 00136 |
| | SET the queue-command to "BACKSTORE LOAD" | 00137 |
| | FI | 00138 |
| | * finish describing the pending register assignment * | 00140 |
| 235 | SET the status of * either the new or previously backstored item | 00142 |
| | to "IN THE QUEUE" | 00143 |
| 236 | SET its first-use-point to the value of instruction-counter | 00144 |
| 237 | IF the quantity is a register pair | 00145 |
| 238 | THEN | 00146 |
| | SET register-size to 2 | 00147 |
| 239 | OTHERWISE | 00148 |
| | SET register-size to 1 | 00149 |
| | FI | 00150 |
| 240 | IF request cannot use register 0 | 00151 |
| | THEN | 00152 |
| 241 | SET its complete-set-count to | 00153 |
| | register-size | 00153 |
| | + number of restricted registers | 00155 |
| | OTHERWISE | 00156 |
| 242 | SET its complete-set-count to | 00157 |
| | register-size- + 1 * for register 0 * | 00158 |
| | + number of restricted registers | 00159 |
| | − register-0-restricted * to avoid counting twice * | 00160 |
| | FI | 00161 |
| 245 | ENQUEUE the element-being -managed to the end of | 00162 |
| | the pending-assignment-queue | 00163 |
| 246 | IF the element is a LOAD OR BACKSTORE LOAD | 00164 |

TABLE 8-continued

Register Manager - Part 3

|     |                                                                 |       |
| --- | --------------------------------------------------------------- | ----- |
|     | THEN                                                            | 00165 |
| 247 | SET the instruction-counter up by 1                             | 00166 |
|     | FI                                                              | 00167 |
| 248 | SET the last-used-point to the instruction counter              | 00168 |
| 249 | IF the pending element is an absolute register                  | 00169 |
|     | THEN                                                            |       |
| 250 | IF this first use is not also its last use                      | 00170 |
|     | THEN                                                            | 00171 |
| 251 | SET register-restricted up by 1                                 | 00172 |
|     | SET its complete-set-count up by 1 * to assure that its *       | 00173 |
|     | * resolution does not force an address into register 0 *        | 00174 |
| 252 | IF it is register 0                                             | 00175 |
|     | THEN                                                            | 00176 |
| 253 | SET register-0-restricted to 1                                  | 00177 |
|     | FI                                                              | 00178 |
|     | FI                                                              | 00179 |
|     | FI                                                              | 00180 |
|     | FI                                                              | 00181 |
|     | END Register-Manager                                            | 00182 |

Figure 15:
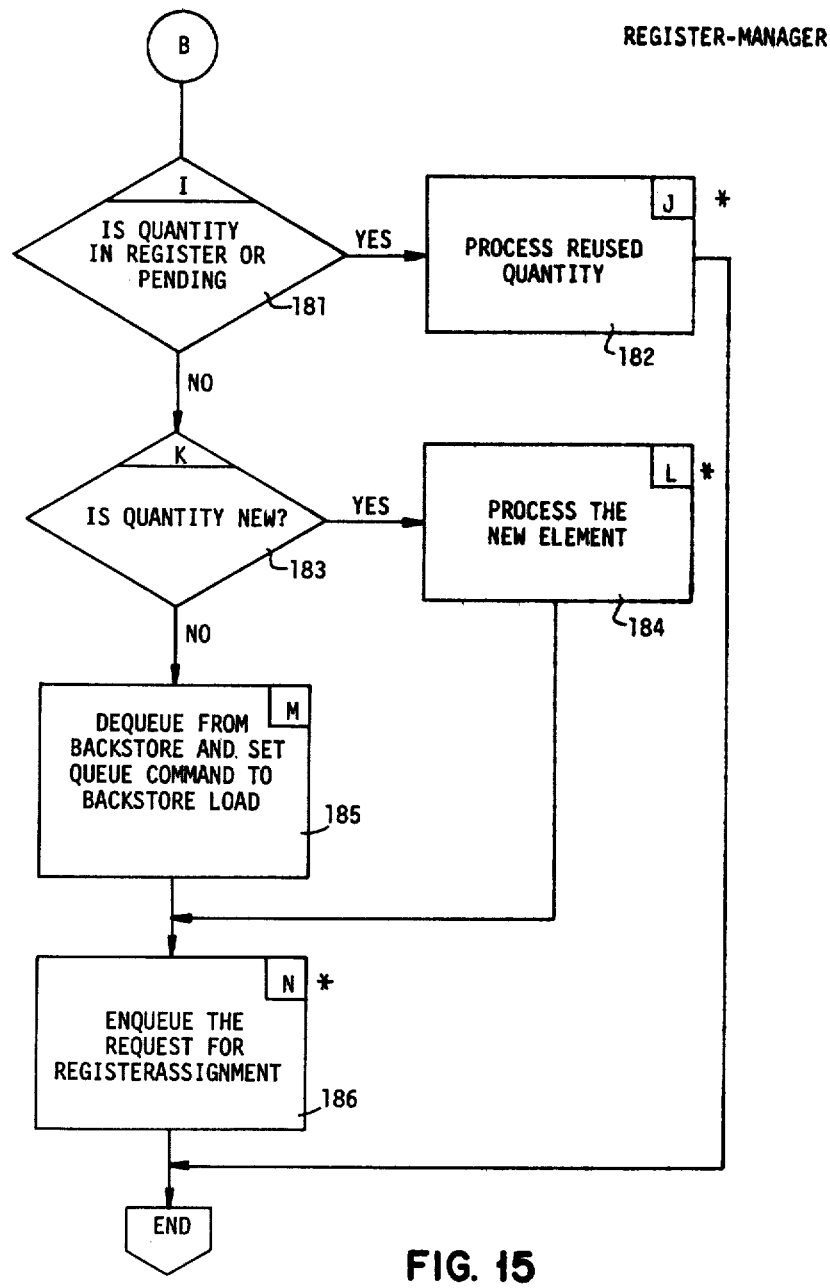
Figure 16:
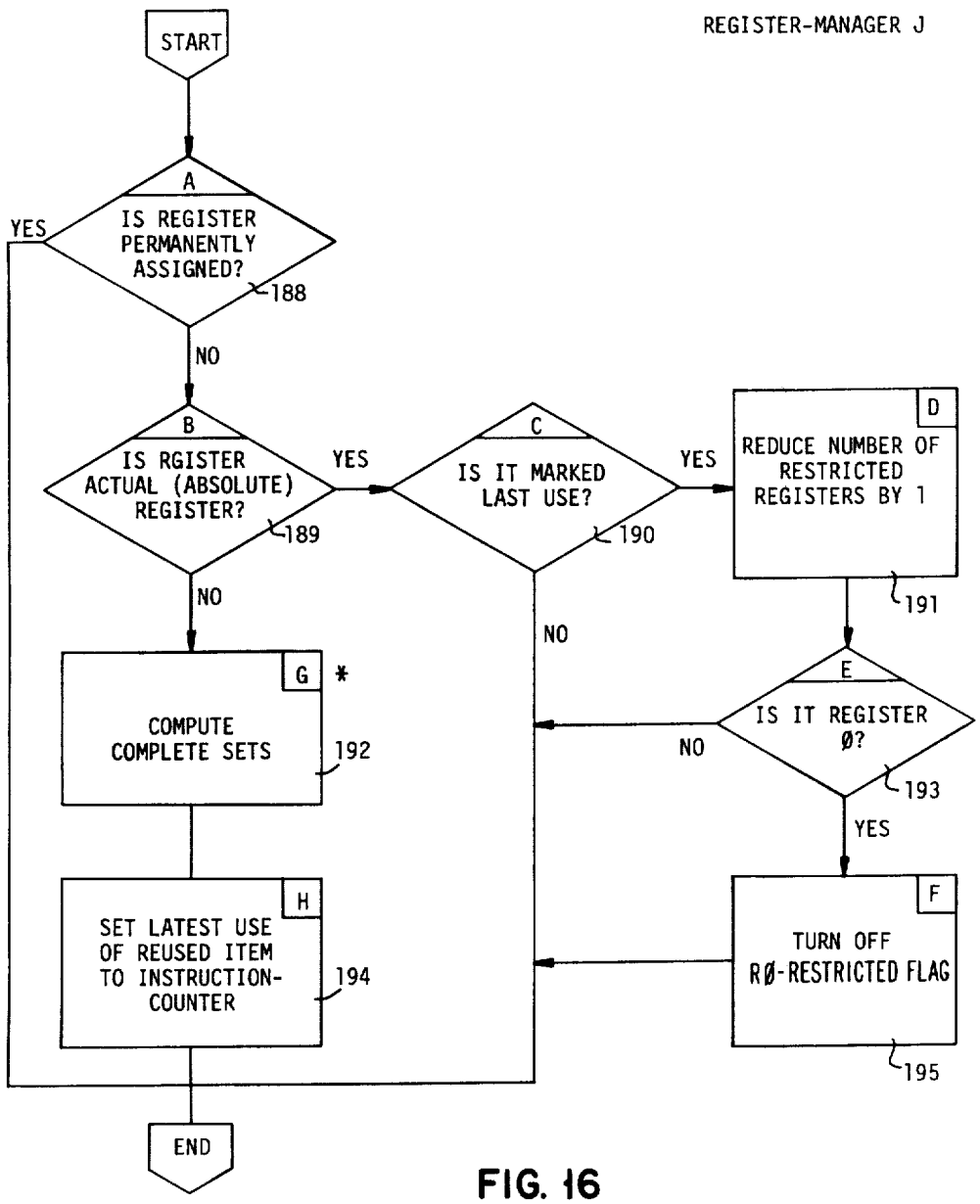
Figure 17:
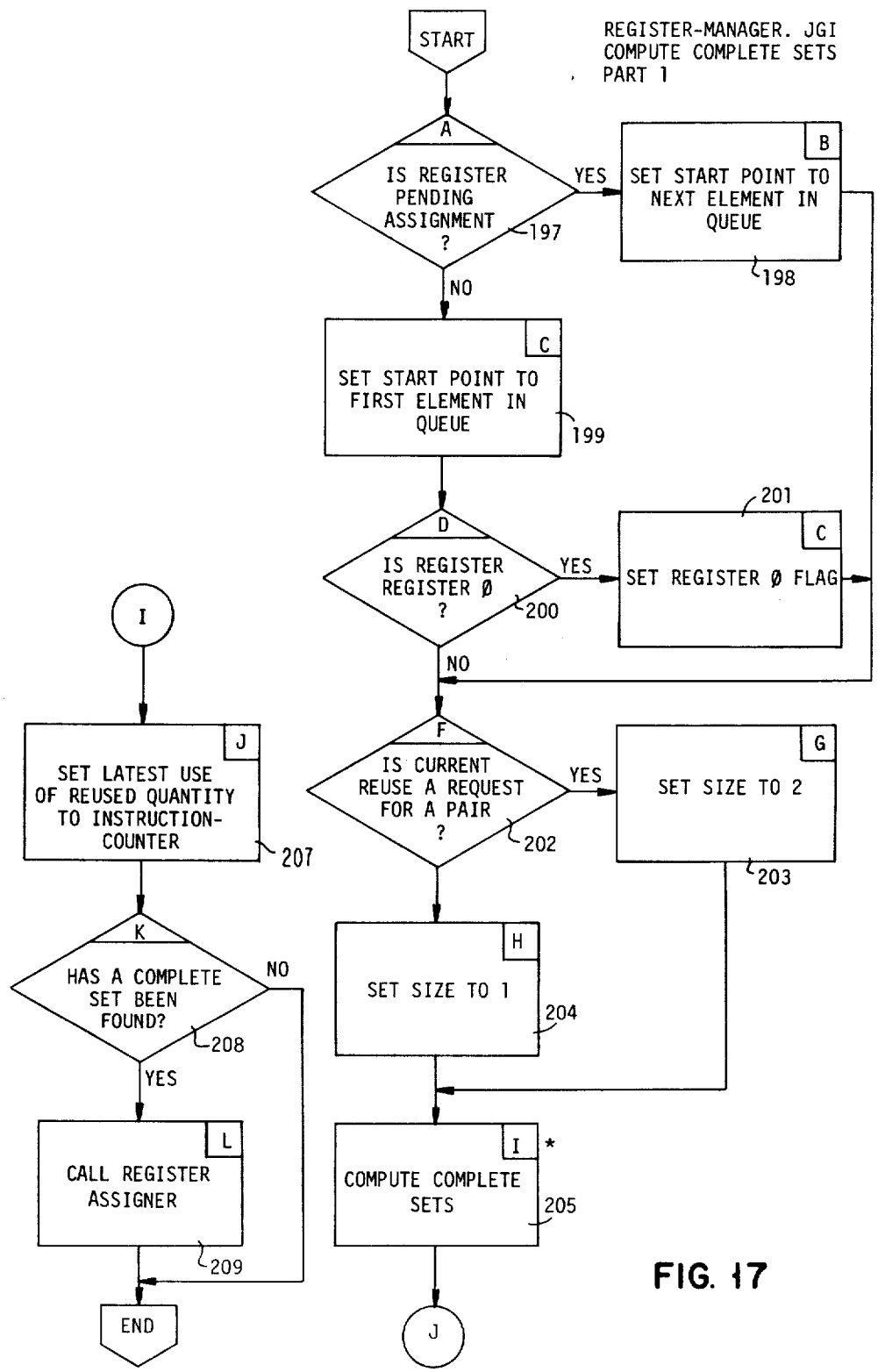
Figure 18:
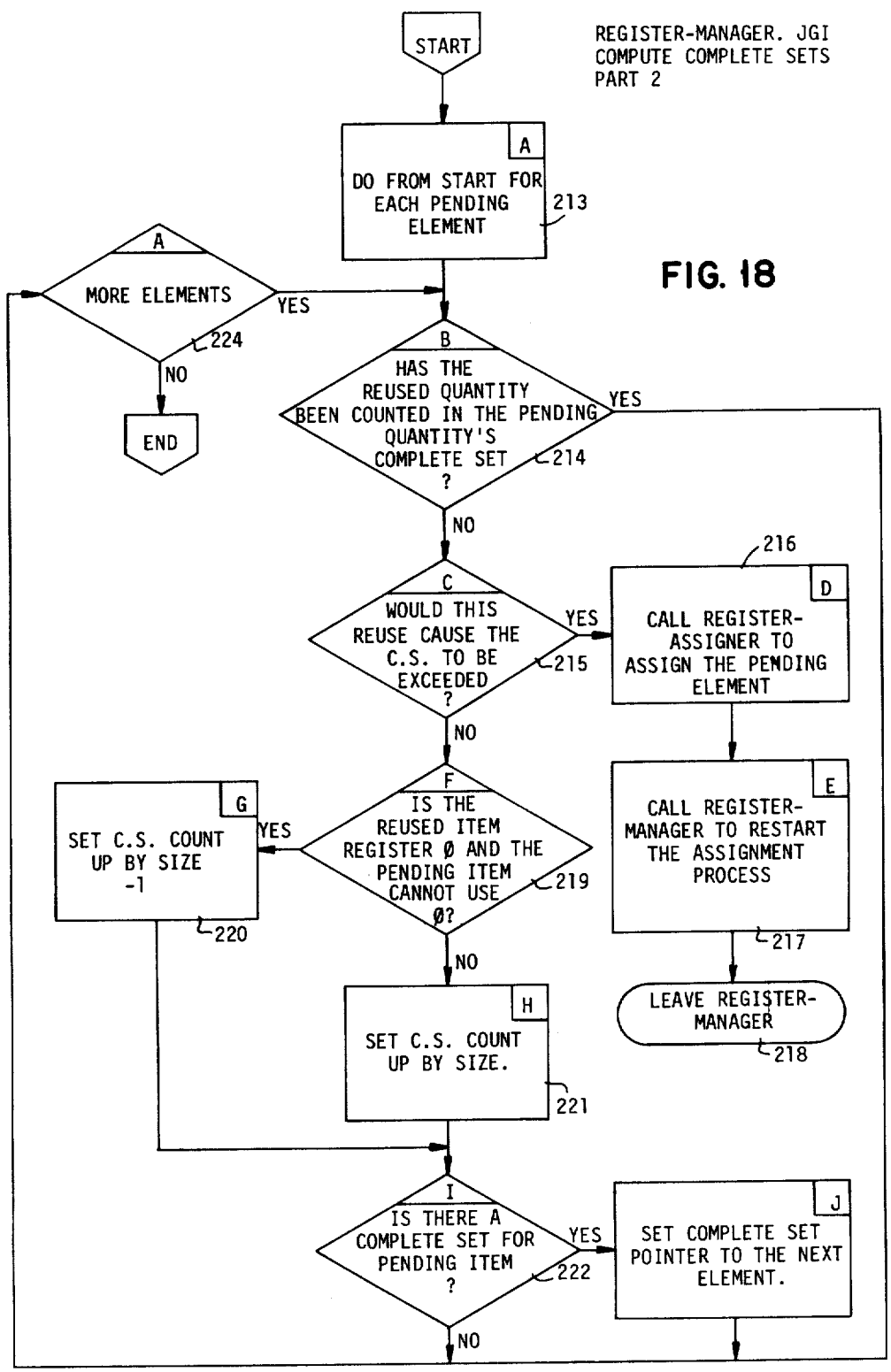

Referring to FIG. 15, in connection with Tables 7 and 8, in steps 181, 182, if the quantity is in a register or pending assignment to a register, as determined from its elements-being-managed record (FIG. 2), then it is processed as a reused quantity (see FIGS. 16–18). In steps 183, 184, if the quantity is new, it is processed as a new quantity (see FIG. 19). In step 185, as the quantity is neither in a register, pending, or new, it must be in the backstore—consequently, it is retrieved from backstore. In step 186, new elements and backstored elements ae enqueued into 92 for register assignment—as is described in FIGS. 20 and 21.

In steps 188–195, if the reused quantity in a register (found in step 181) is permanently assigned, then register manager 65 ends. Otherwise, and if the register is not an absolute register, then in steps 192 and 194 the complete set of the reused register is computed (see FIGS. 17 and 18), and the latest use field 46 set to the instruction counter 26 value. In steps 189–190, 191, 193, 195, if the register is an absolute register (a quantity assigned to an actual register), the request is processed, as appropriate, according to its last use status and register ∅ usage.

In FIG. 17 is set forth in greater detail the compute complete sets step 192 of FIG. 16—with FIG. 18 further describing step 205 of FIG. 17. When the quantity of register request 50 is found to be neither permanently assigned, (step 188) nor assigned an absolute register (step 189), then this is a reuse of the register, and the complete set count of certain quantities pending in queue 92 must be updated. If the register request 50 is for an element pending on queue 92, then in step 198 start pointer 21 is set to the next element in queue 92, and processing branches to step 202. Otherwise, in steps 199–201, start pointer 21 is set to the first element in queue 92, and register ∅ flag set if required.

In steps 202–204, the request size (also referred to as width) is set to the number of registers in (or consumed by) the request, and in step 205 the complete sets are computed (see FIG. 18, below). In step 207, latest use field 46 of the reused quantity is set to the value in instruction counter 26. If a complete set has been found, then register assigner 66 is called in step 209, which will process queue 92 to assign registers to quantities up through the element pointed to by pointer 24.

In FIG. 18 is set forth the steps for computing complete sets (step 205, FIG. 17). For each pending element in queue 92, from start pointer 21 through end pointer 22, it is determined if the reused quantity has been counted in the pending quantities complete set. The reused quantity has been counted if its latest use prior to this reuse (field 46 of the reused element being managed) is after (greater than) the first use of the pending element (field 45 of the pending element being managed). If not, in steps 215, 219–221 the complete set count in field 49 is increased and in step 222 the existence of a complete set is tested. If there is a complete set, in step 223 complete set pointer 24 is set to the next element in queue 92. If in step 215 it is determined that this reuse quantity would cause the complete set for the element to be exceeded, in step 216, register assigner 66 is called to assign this pending element in queue 92 to a register, and in step 217 processing returns to register manager 65.

In FIG. 19, the register manager 65 process steps for processing a new element (step 184 of FIG. 15) are set forth. If the quantity of register request 50 is of a type that requires a register load instruction, then register manager 65 must be recursively called to force a basing register for the quantity being loaded to be assigned. In step 228 the quantity's base address is computed. If the base address is not yet directly addressable by register 12 or 13, then in step 230 register manager 65 is recursively called, with the computed (still symbolic) base address from step 228 as the argument of register request 50. In step 232 the LOAD command (see step 268) is entered into queue 92 and the instruction counter 26 incremented; and in step 231 the request is added to names search vector 30. In step 229, ASSIGN queue commands (see step 266) are given quantities which need not be loaded.

Figure 20:
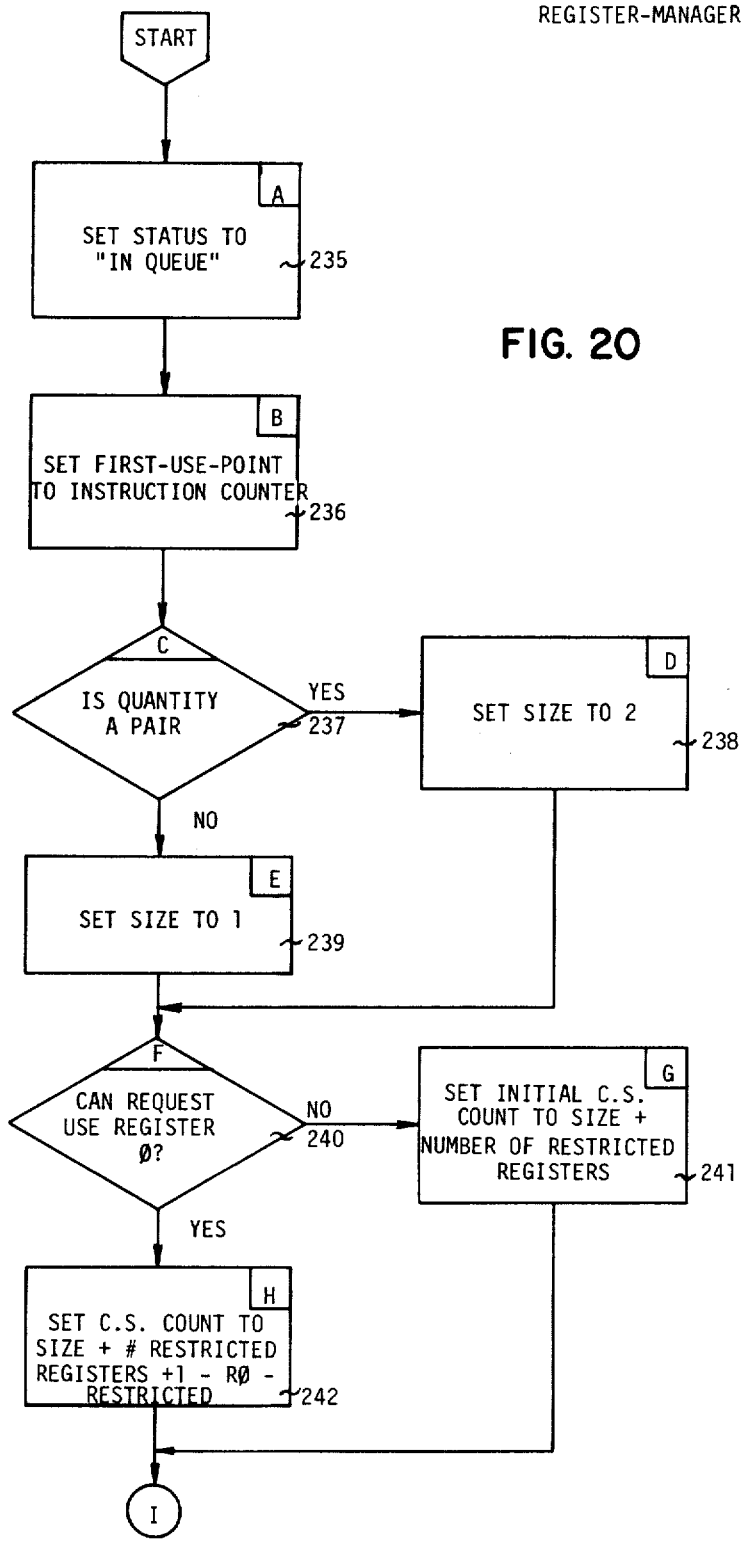
Figure 21:
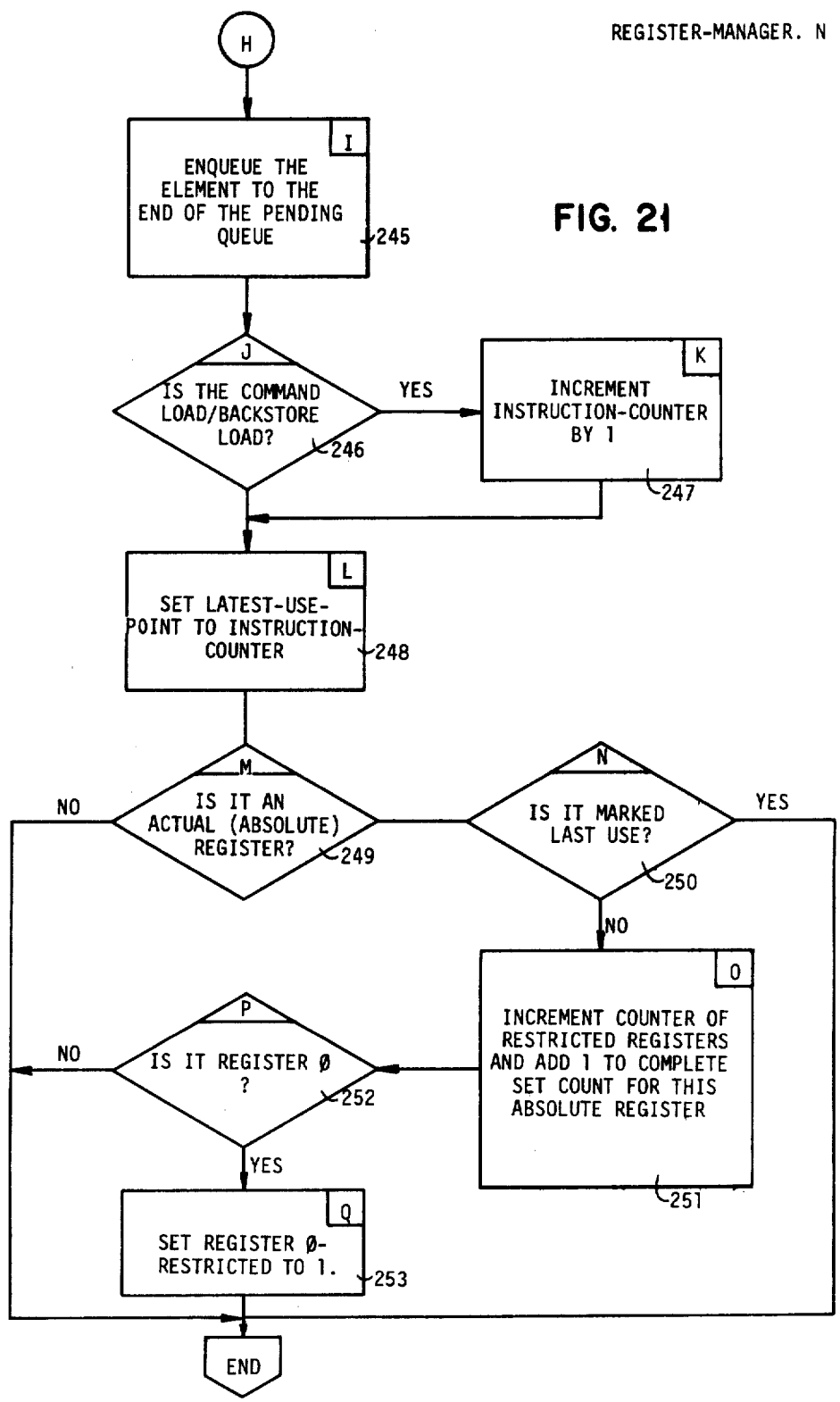

In FIGS. 20–21, enqueue step 186 of FIG. 15 is described in greater detail. In step 186, request for a new quantity in a register is enqueued for register assignment. This is done by, in steps 235–242, setting register status 44 to "in queue", setting first use point 45 to the value of instruction counter 27, and complete set count in field 49. The register request element 40 is then added to queue 92 in step 245. If the element is a LOAD or BACKSTORE load command, instruction counter 26 is incremented by one in step 247. In step 248, latest-use-point field 46 is set equal to instruction counter 26. If the request is for an absolute register that is not marked for last use, then the count of restricted registers is incremented by one, and one is added to the complete set count field 49 as a safety precaution—so that an address quantity in this absolute register will not be moved into register Ø. In step 253, if the request is for absolute register Ø, and it is not marked for last use, then register Ø is marked restricted.

REGISTER ASSIGNER

The operational steps executed by the computing system under control of register assigner 66 are set forth in FIGS. 22-35, and in Tables 9-12.

Figure 22:
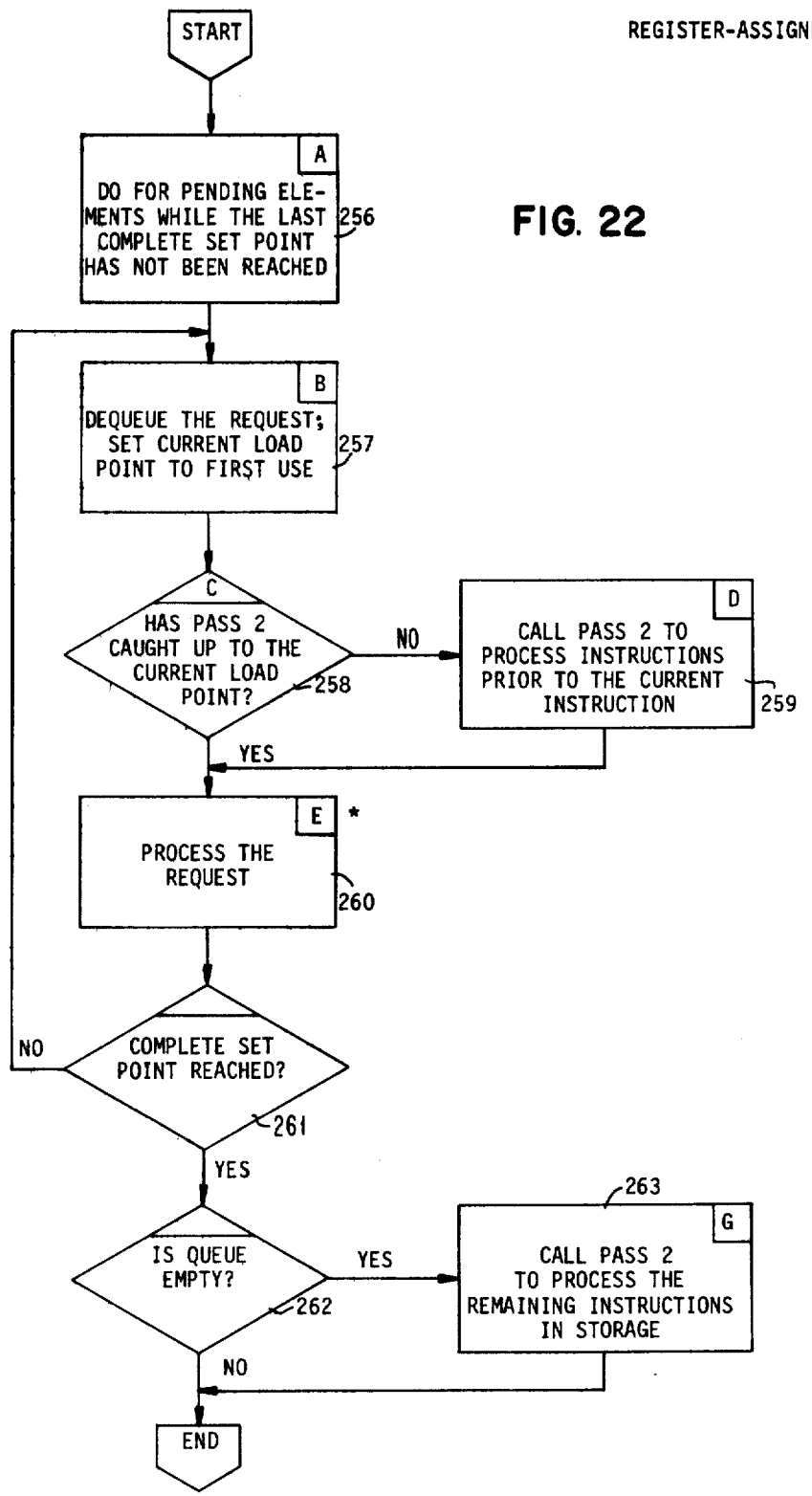

Referring first to FIG. 22 in connection with Table 9, the register assigner, when called, services pending elements 40 in queue 92 beginning (at step 256) with that element anchored to start pointer 21 (referred to as "queue-elements-start") and ending with that element anchored to complete set pointer 24 (referred to as "resolve-until-we-get-to-here").

In step 257, the request element in queue 92 pointed to by start pointer 21 is dequeued, and the current load pointer counter set to point in storage 83 to the first use of the element as determined from field 45. If pass 2 counter 27 has not caught up to current load point counter 25, then in step 259 pass 2 processor 69 is called to process instructions prior to the current instruction. In step 260, the dequeued request is processed (FIG. 23) to assign symbolic registers to actual registers. This is repeated until the complete set point 24 is reached in queue 92. If at that point, queue 92 is empty, in step 263 pass 2 is called to process the remaining instructions in storage 80.

Figure 23:
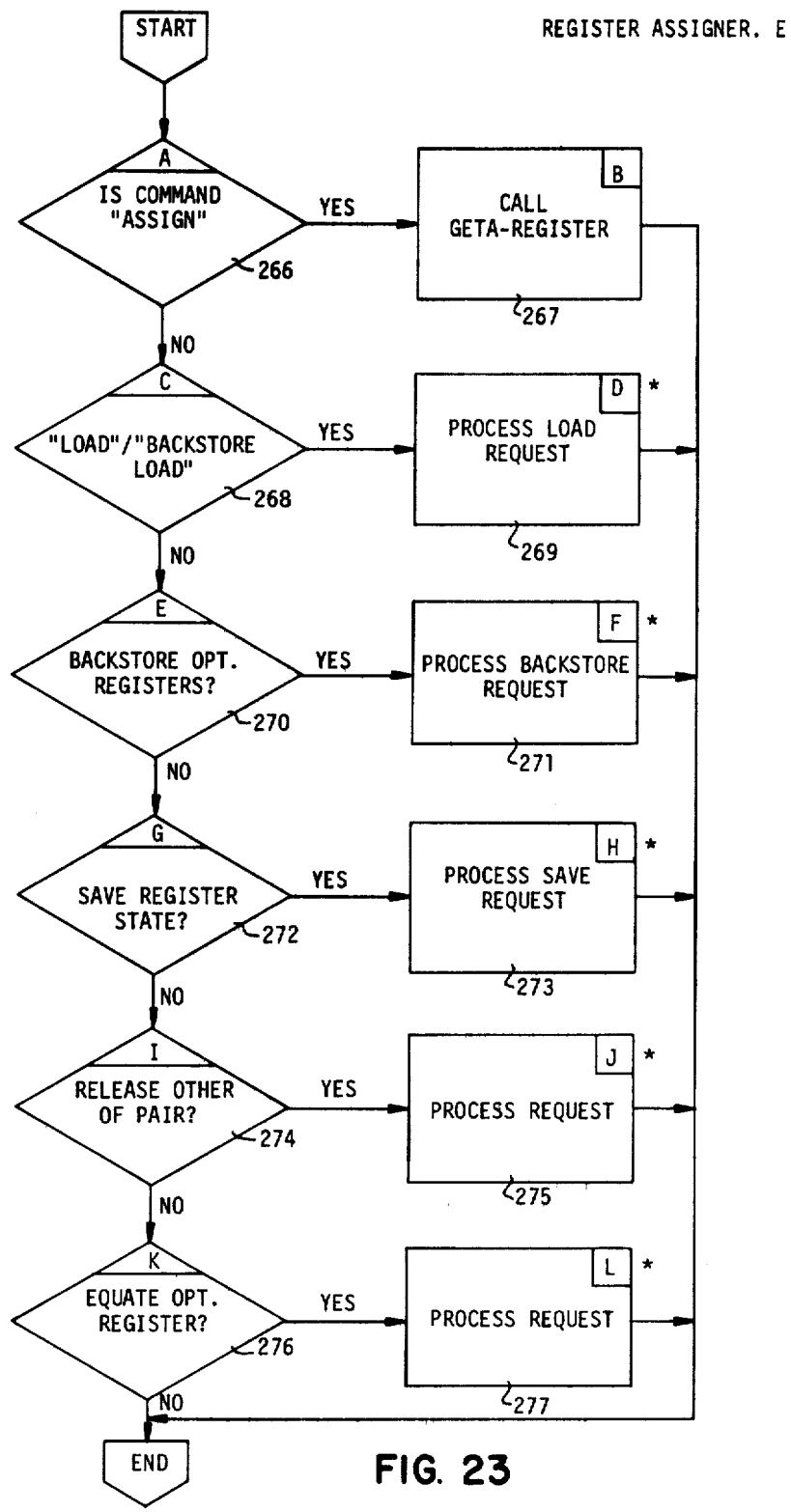

In FIG. 23, detail with respect to step 260 is provided. In steps 266, 268, 270, 272, 274 and 276 the queue command 47 is tested to determine the action to be taken, with steps 267, 269, 271, 273, 275, 277 carrying out the required action—as is more fully explained in connection with FIGS. 24-35.

TABLE 9

| | Register Assigner | |
|---|---|---|
| 186 | Register-Assigner Procedure | 00001 |
| | with argument (resolve-until-we-get-to-here) | 00002 |
| 256 | DO current-pointer begins with queue-elements-start and | 00004 |
| | process successive requests in the pending request queue | 00005 |
| | while current-pointer is not resolve-until-we-get-to-here | 00006 |
| 257 | SET current-load-point to first-use-point of the pending element | 00008 |
| | DEQUEUE the pending element | 00010 |
| 258 | If pass2-instruction-counter is less than current-load-point | 00012 |
| | THEN | 00013 |
| 259 | CALL Pass2 (current-load-point) | 00014 |
| | FI | 00015 |
| | CASE (Queue-command) | 00017 |
| 266 | WHEN ("ASSIGN") | 00019 |
| 267 | CALL Get-a-Register | 00020 |
| 268 | WHEN ("ICAD", "BACKSTORE LOAD") | 00022 |
| 280 | COMPUTE its basing-register-value | 00023 |
| 281 | IF the basing-register-value is not an absolute register | 00024 |
| | THEN | 00025 |
| 282 | CALL Register-Resolver (basing-register-value) | 00026 |
| | FI | 00027 |
| 283 | CONSTRUCT a load instruction | 00028 |
| 284 | CALL Get-a-Register | 00029 |
| 285 | INSERT the register in the instruction | 00030 |
| 286 | WRITE the instruction | 00031 |
| 270 | WHEN (backstore optimization registers) | 00033 |
| 289 | DO for each reister | 00034 |
| 290-1 | IF the register contains an optimization register AND | 00035 |
| | the register has not been backstored | 00036 |
| | THEN | 00037 |
| 292 | CALL Backstore | 00038 |
| | FI | 00039 |
| 293 | END | 00040 |
| 272 | WHEN (save register state) | 00042 |
| 296 | DO for each register | 00043 |
| 297-8 | IF the register contains an optimization register AND | 00044 |
| | the register has not been backstored | 00045 |
| | THEN | 00046 |
| 299 | CALL Backstore | 00047 |
| | FI | 00048 |
| 300 | END | 00049 |
| 301 | IF there is already a saved pending state | 00050 |
| | THEN | 00051 |
| 302 | DO for each register in the saved state | 00052 |
| 304 | IF the saved register contents are not | 00053 |
| | the same as the current contents | 00054 |
| | THEN | 00055 |
| 305 | REMOVE the register from the saved set | 00056 |
| | FI | 00057 |
| | END | 00058 |
| | ELSF | 00059 |
| 303 | SAVE the current register state for this label | 00060 |
| 307 | FI | 00061 |
| 274 | WHEN (release other of pair) | 00063 |
| 309 | FIND the register pair | 00064 |
| 310 | FREE the other of the pair | 00065 |
| 311 | DEQUEUE pending request to assign the new symbolic register | 00066 |
| 312 | ASSIGN the symbolic register to the former pair half | 00067 |
| 276 | WHEN (equate symbolic register) | 00069 |
| 315 | FIND the symbolic register | 00070 |
| 316 | DEQUEUE the request for the optimization register | 00071 |

TABLE 9-continued

| | Register Assigner | |
|---|---|---|
| 317 | ASSIGN the optimization register to the symbolic register | 00072 |
| 278 | END CASE | 00074 |
| 261 | END | 00075 |
| 262 | IF the queue is empty | 00077 |
| | THEN | 00078 |
| | SET current-load-point to instruction counter + 1 | 00079 |
| 263 | CALL PASS2 (current-load-point) | 00080 |
| | FI | 00081 |

Figure 24:
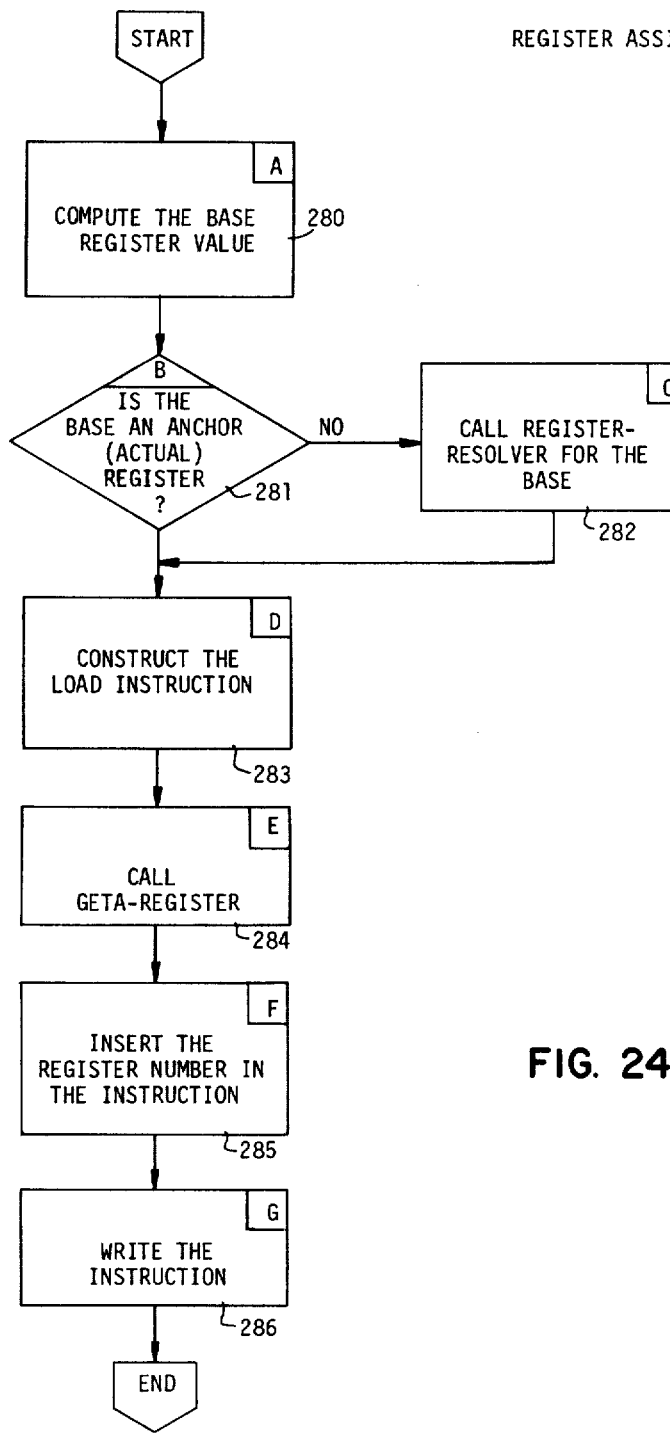

Process load request 269 is explained in FIG. 24. In step 280, the load instruction base register value is computed. If the computed base value is not an actual (i.e., register 12 or 13), but rather a symbolic register—then in step 282 register resolver 68 is called for the base. In step 283 the load instruction is constructed, in steps 284 and 285 the register number is obtained and put in the instruction, which will then be written to output stream 71 in step 286.

Figure 25:
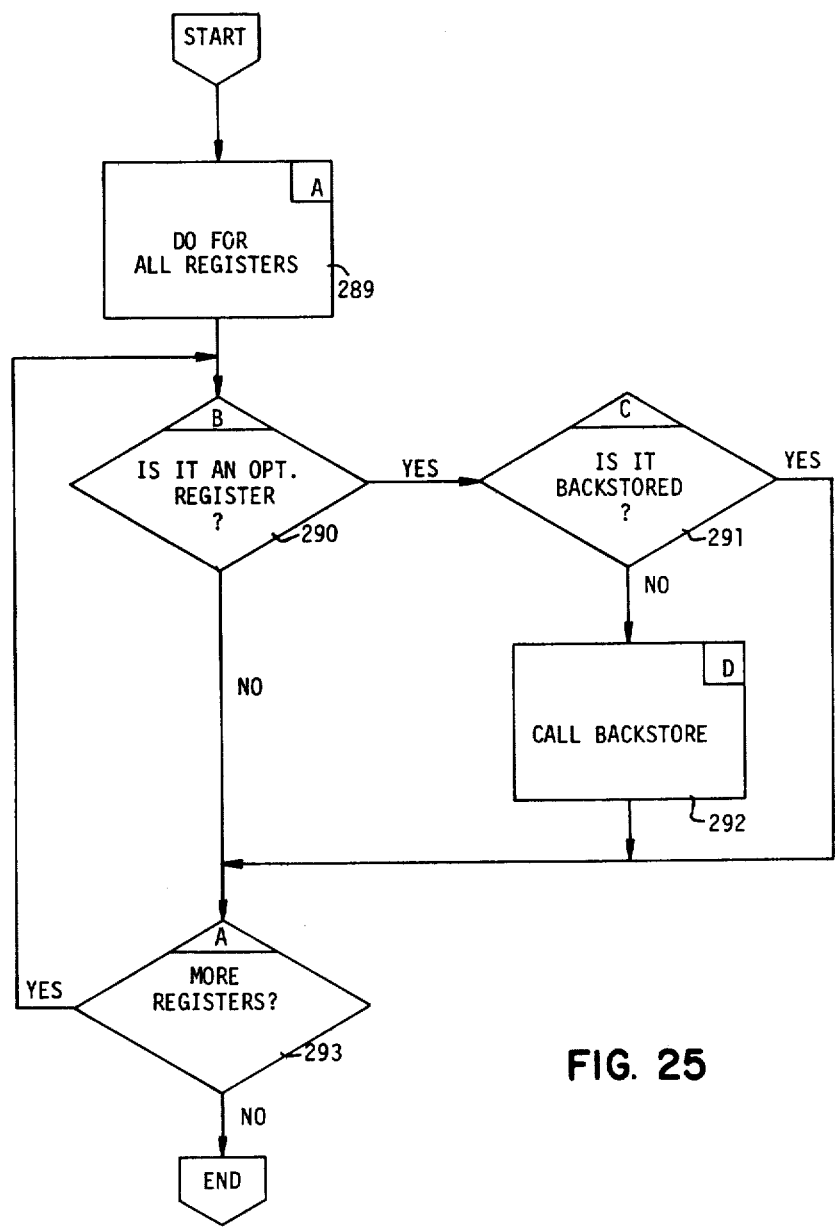

Process backstore request 271 is explained in FIG. 25. If the queue command is to backstore an optimization register that has not been previously backstored, then backstore (FIG. 35) is called in step 292.

Figure 26:
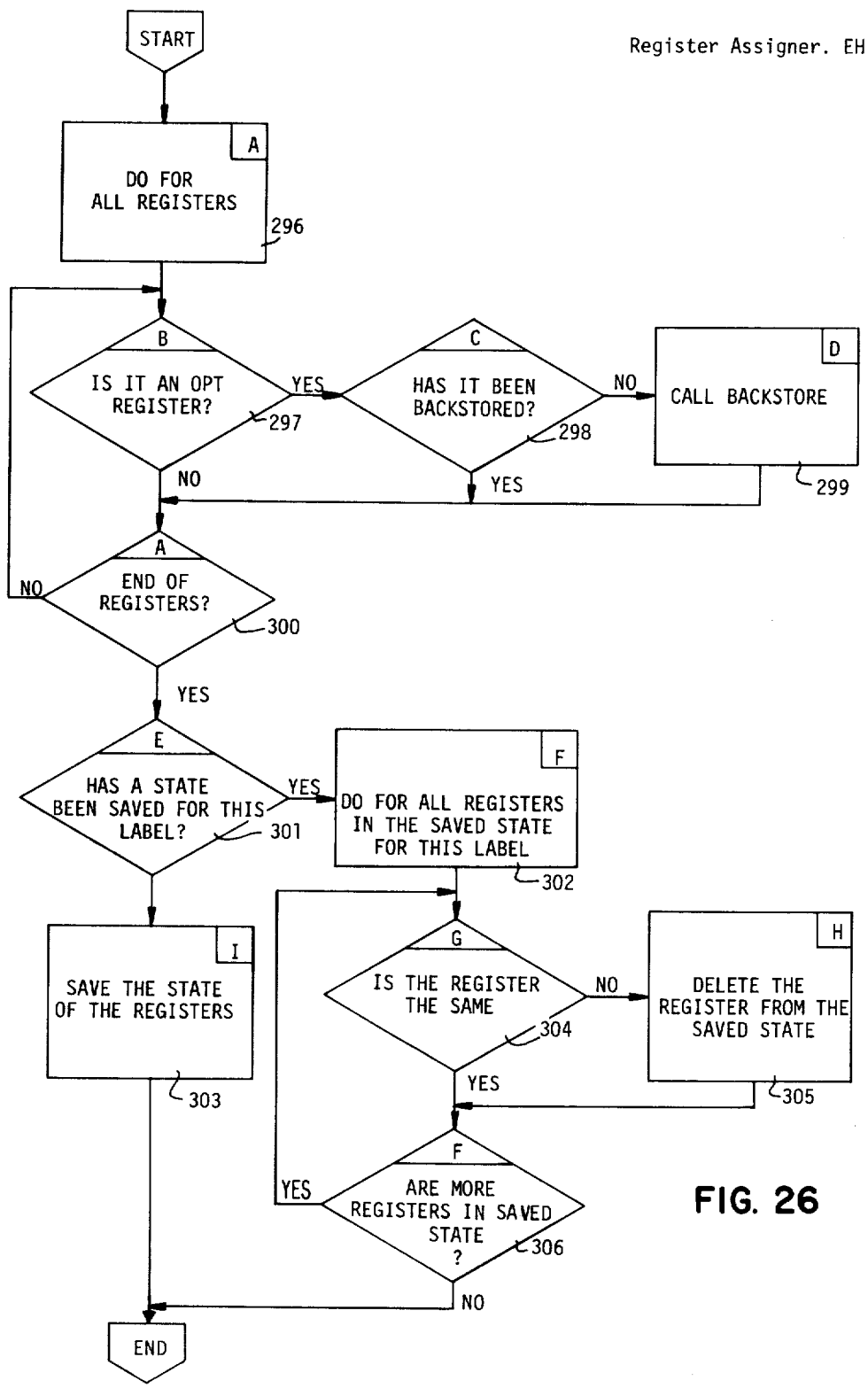

Process save request 273 is explained in FIG. 26. A save request pertains to the saving of registers at a label (see step 118). In steps 296–300, all optimization registers not previously backstored have instructions generated and written out to output stream 71 to backstore to save their contents. In steps 301–306, register assigner 66 assures that the current state of all registers for the label are saved.

Process request to release other of a pair 275 is explained in FIG. 27. In step 309, the register pair is found in register list 91, and the other of the pair released in step 310. Release requires modification of fields 42, inter alia, in the element record in list 91. In steps 311 and 312 the pending request is dequeued, and assigned to the other (unreleased) register setting field 42 to the new symbolic register name and adjusting field 43 to reflect the new (single) type.

Process request 277 is explained in FIG. 28, steps 315–317 of which search vector 30 to find the symbolic register, dequeue from queue 92 the optimization register, and assign the former symbolic register number to the optimization register.

Figure 29:
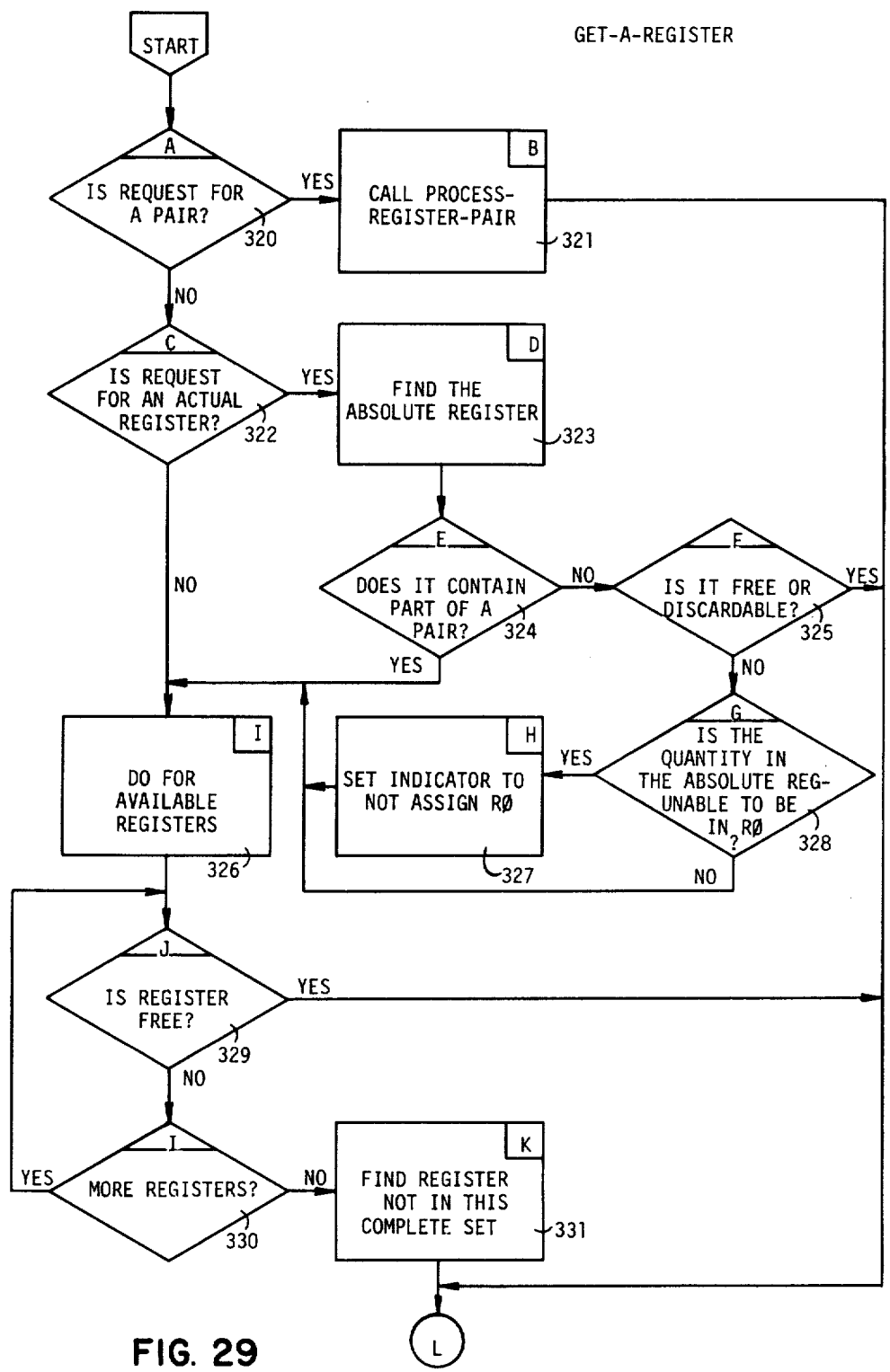
Figure 30:
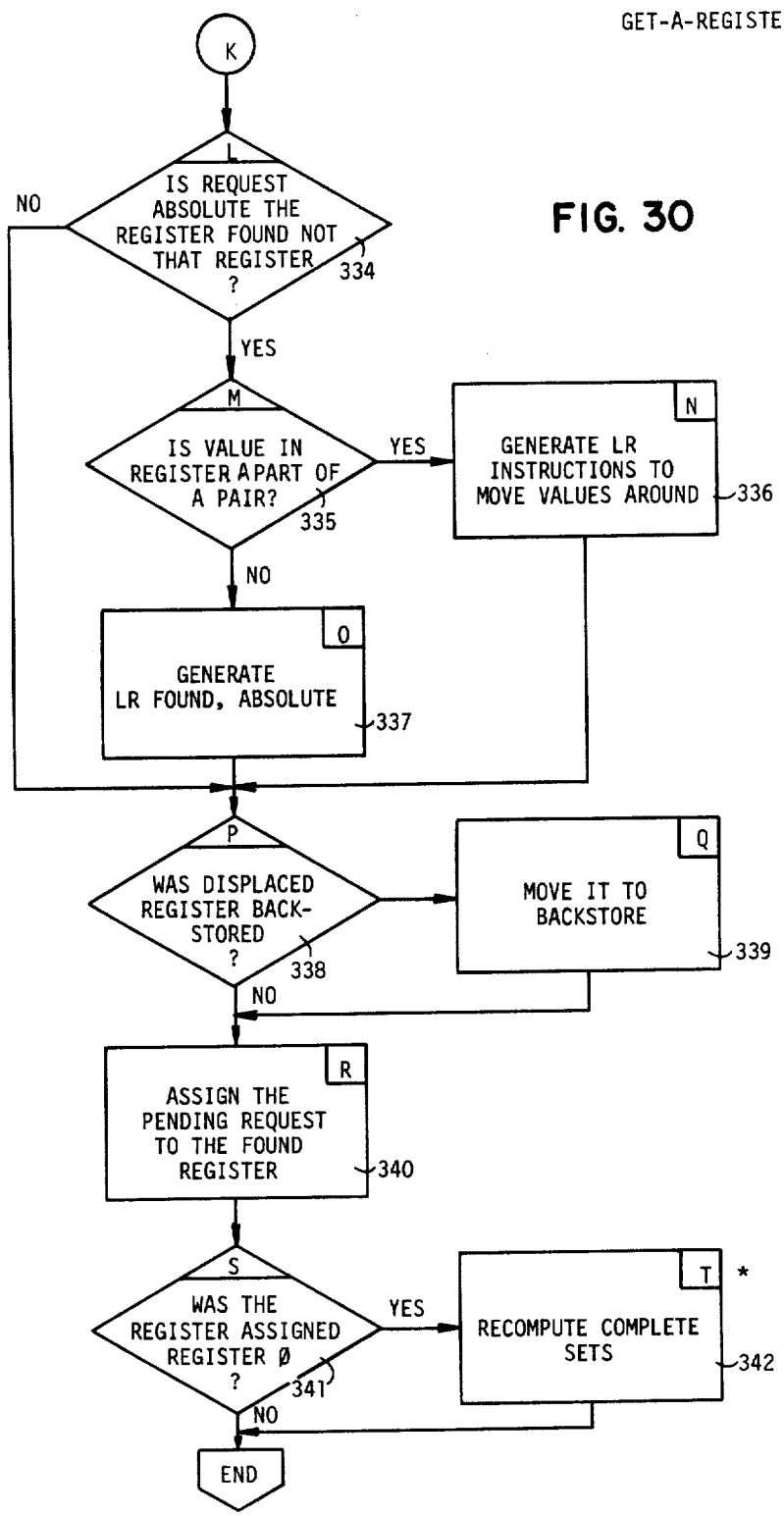
Figure 31:
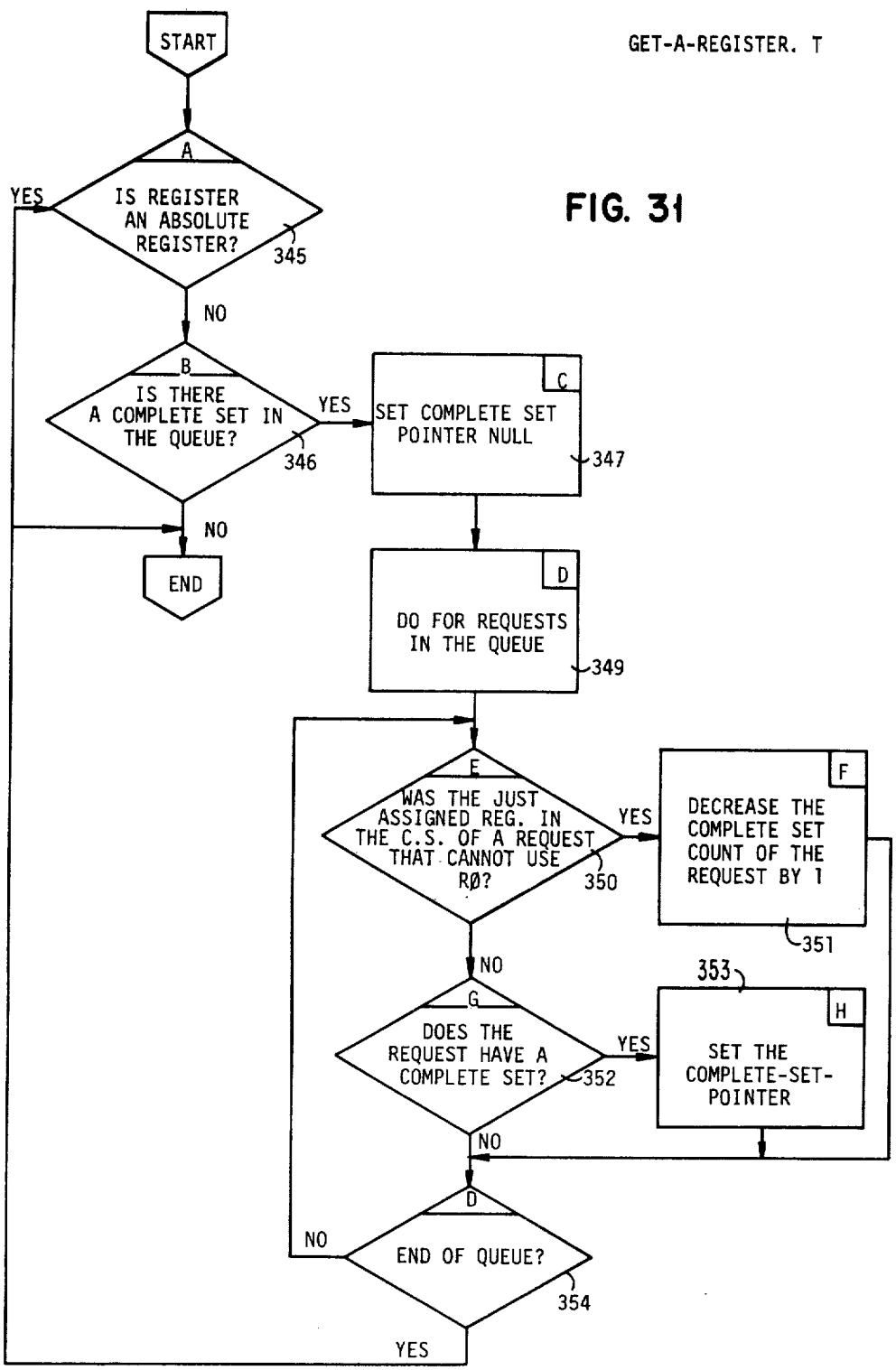

In FIGS. 29–31, and Table 10, are set forth the process steps for get-a-register, a procedure which is internal to register resolver 68 and is called from at least steps 267 and 284.

TABLE 10

| | Get-A-Register | |
|---|---|---|
| | A.2.4 GET-A-REGISTER | SMEZSH3 |
| | Get-a-Register: Procedure * this procedure is internal | 00084 |
| | to the Register-Resolver procedure * | 00085 |
| 320 | IF the request is for a register pair | 00087 |
| | THEN | 00088 |
| 321 | CALL Process-Register-Pair | 00089 |
| | ELSE | 00090 |
| | Find-Register: DC | 00091 |
| 322 | IF the request is for an absolute register | 00092 |
| | THEN | 00093 |
| 323 | FIND the absolute register | 00094 |
| 324 | IF the absolute register does not contain | 00095 |
| | part of a register pair | 00096 |
| 325 | IF the absolute register is free or discardable | 00097 |
| | THEN | 00098 |
| | LEAVE Find-Register | 00099 |
| | FI | 00100 |
| 328 | IF the quantity in the absolute register cannot | 00101 |
| | use register 0 | 00102 |
| 327 | THEN | 00103 |
| | SET an indicator to prevent a Load Register 0 | 00104 |
| | FI | 00105 |
| | FI | 00106 |
| | FI | 00107 |
| | * look for a free register * | 00108 |
| 326 | DO for the registers available | 00109 |
| 329 | IF the register is free | 00110 |
| | THEN | 00111 |
| | LEAVE Find-Register | 00112 |
| | FI | 00113 |
| 330 | END | 00114 |
| | * look for the register not in the complete set * | 00115 |
| 331 | DO for the available registers | 00116 |
| | IF the last use of the register is prior to the | 00117 |
| | current load point | 00118 |
| | THEN | 00119 |
| | IF the register is backstored OR read only | 00120 |
| | THEN | 00121 |
| | LEAVE Find-Register | 00122 |
| | OTHERWISE | 00123 |
| | CALL Backstore | 00124 |
| | LEAVE Find-Register | 00125 |

TABLE 10-continued

| | Get-A-Register | |
|---|---|---|
| | FI | 00126 |
| | FI | 00127 |
| | END | 00128 |
| | ABORT | 00129 |
| | END Find-Register | 00130 |
| | FI | 00131 |
| 334 | IF the request is for an absolute register AND | 00133 |
| | the register found is not that register | 00134 |
| | THEN | 00135 |
| 335 | IF the value in the absolute register is part | 00136 |
| | of a register pair | 00137 |
| | THEN | 00138 |
| 336 | GENERATE Load Register instructions to | 00140 |
| | reallocate the registers | 00141 |
| | *   For Example   * | 00142 |
| | *   Free In-Use Pair   Pair   * | 00143 |
| | *   becomes   * | 00144 |
| | *   Pair Pair Absolute In-use   * | 00145 |
| | ELSEDO | 00147 |
| 337 | GENERATE a Load Register instruction to move the quantity | 00148 |
| | in the Absolute register to the free register | 00149 |
| | FI | 00150 |
| | FI | 00151 |
| 338 | IF the quantity being displaced has been backstored | 00153 |
| | THEN | 00154 |
| 339 | MOVE it to the Backstore | 00155 |
| | FI | 00156 |
| 340 | ASSIGN the register to the pending element | 00158 |
| 341 | | |
| 345 | IF the register just assigned was register 0 AND | 00160 |
| | the register is not an absolute register AND | 00161 |
| 346 | there is at least one complete set in the queue | 00162 |
| 342 | THEN * recompute the complete sets * | 00163 |
| 349 | DO for all elements in the queue | 00164 |
| 350 | IF the enqueued element cannot be put into register 0 AND | 00165 |
| | the just assigned register was counted in its complete set | 00166 |
| | THEN | 00167 |
| 351 | SET the complete set count for the enqueued element | 00168 |
| | down by 1 | 00169 |
| | OTHERWISE | 00170 |
| 352 | IF the enqueued element still contains a complete set | 00171 |
| | THEN | 00172 |
| 353 | SET complete-set-point to point to the next element | 00173 |
| | FI | 00174 |
| | FI | 00175 |
| | END | 00176 |
| 354 | FI | 00177 |
| | END Get-a-Register | 00179 |

In FIG. 29, steps 320, 321, process register pair (FIGS. 32-34) is called if the assignment for the dequeued element is for a pair of registers. If not, in steps 322-325, 327-328, for requests for an absolute (also refered to as an actual) register, it is determined if the request is for part of a pair, whether it is free or discardable, and/or if it is unable to use register zero. In steps 326-331 a search is made of available registers in register list 91 for a free register or, failing that, a register not of the complete set of the current register—and, if necessary to displace a register, that register is, if required, backstored. For the purpose of step 326, a register is available if it is not restricted and not permanently assigned and, if the pending quantity cannot use register 0, it is not register 0.

In FIG. 30, steps 334-337, if the register request is for an absolute register, but the register found is not that register, then the load register instructions are generated to reallocate register values. In steps 338, 339, registers that were previously backstored are moved to the backstore list 93. In step 340 the pending request is assigned to the found register, and in steps 341, 342 the complete sets are recomputed if necessary. (See FIG. 31.)

In FIG. 31, the complete sets are recomputed when required by steps 341, 342. In steps 345-354, the complete set count and complete set pointers are managed for this request.

Figure 32:
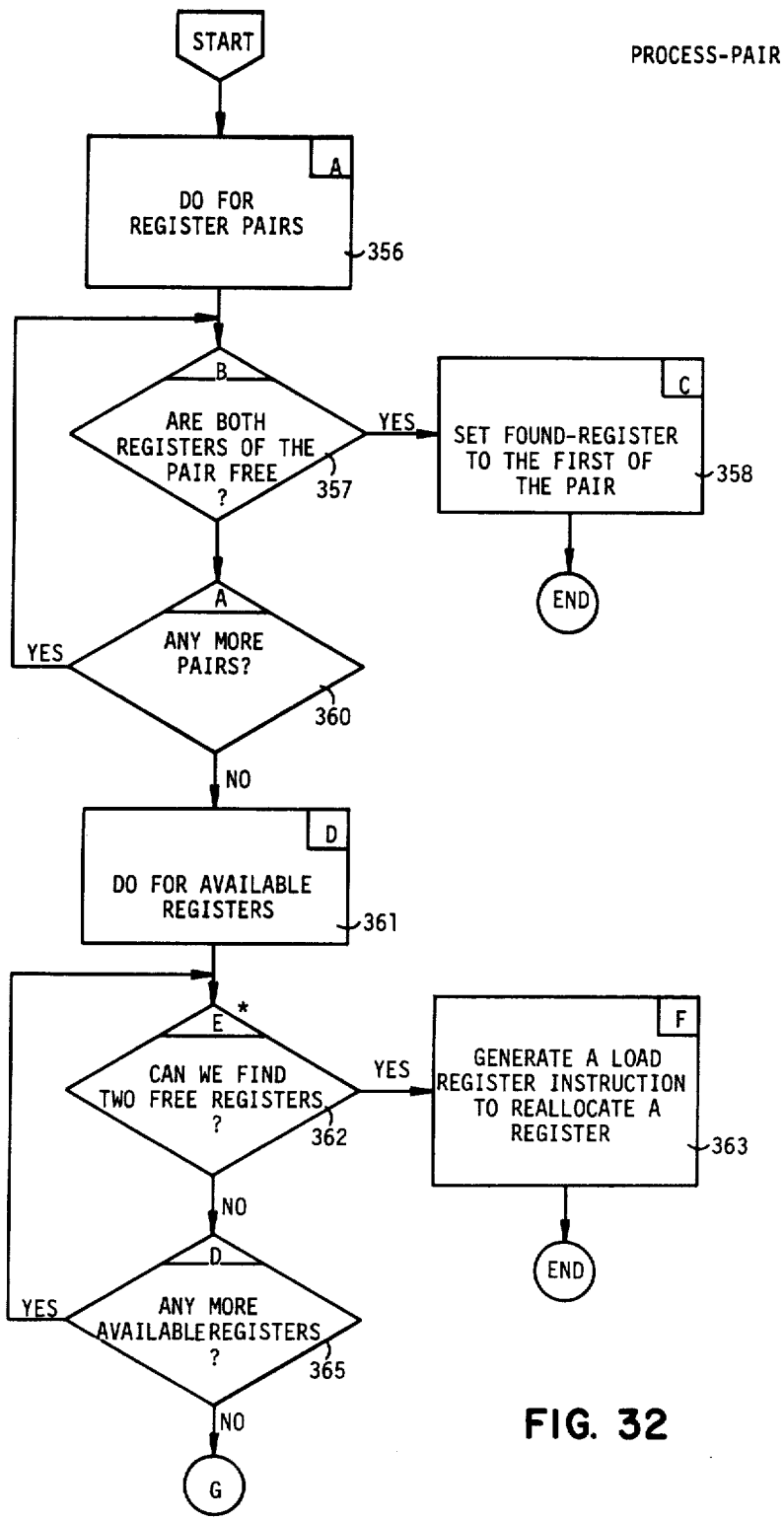
Figure 33:
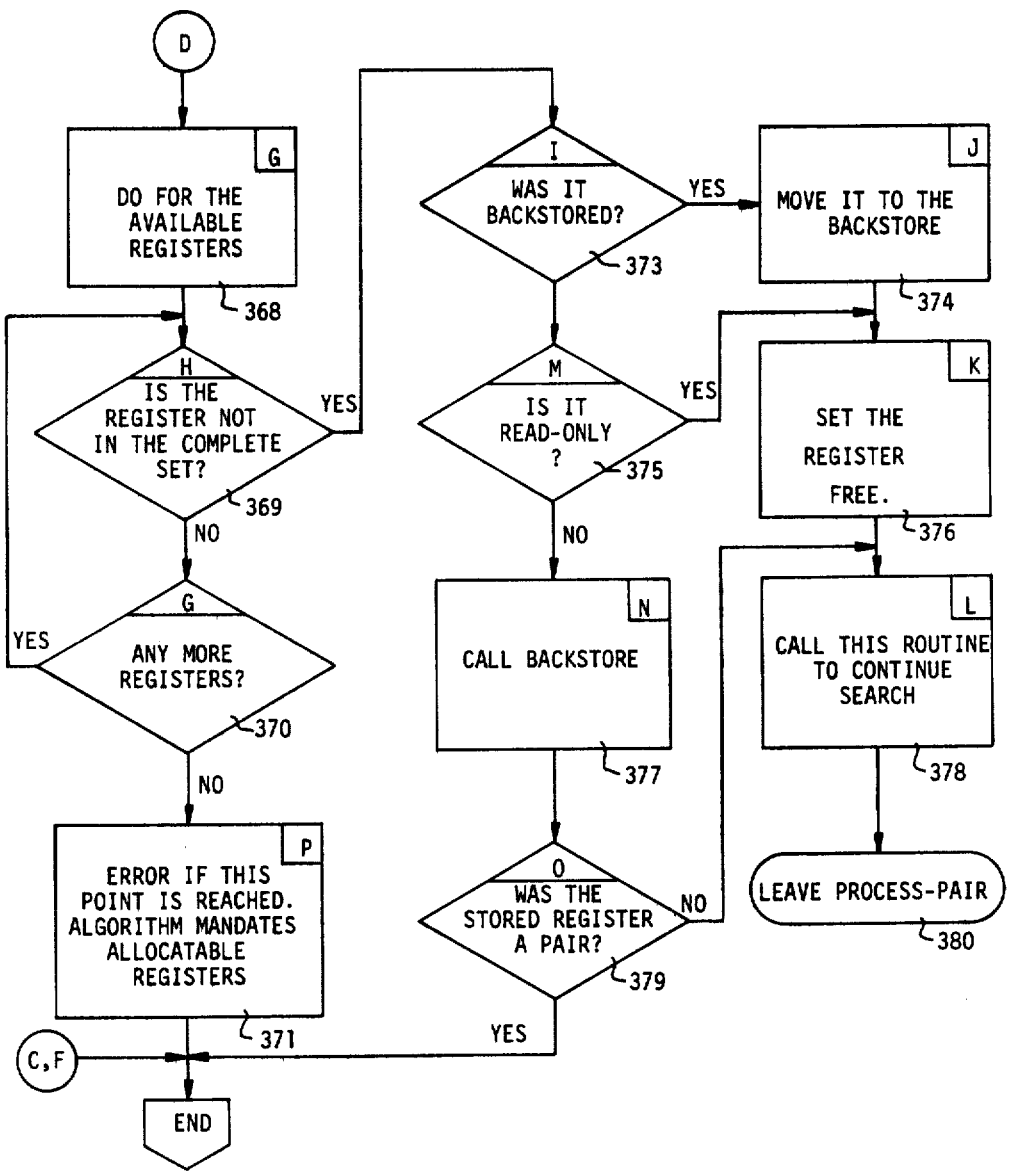
Figure 34:
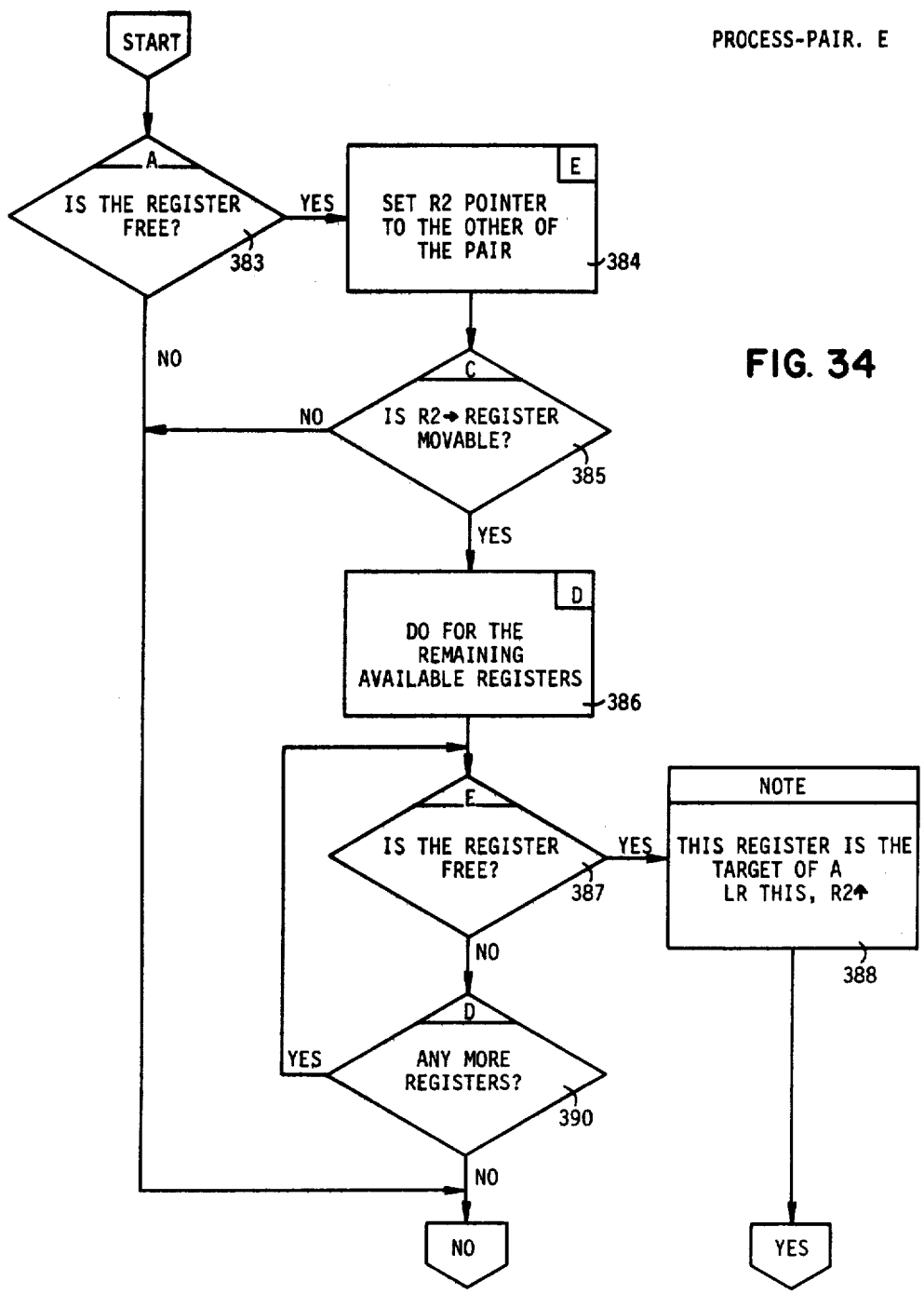

In FIGS. 32-34 and Table 11, the procedure for processing a process pair request is set forth. This procedure is internal to register assigner 66, and is called from step 321 of get-a-register (FIG. 29) when a register pair is to be assigned in response to either of queue commands ASSIGN or LOAD/BACKSTORE LOAD (steps 267, 284).

TABLE 11

| | Process Pair | |
|---|---|---|
| | Process-Pair PROCEDURE | 00181 |
| 356 | DO for the available registers * looking for a free pair * | 00183 |
| 357 | IF the even of the pair is free | 00184 |
| | THEN | 00185 |
| | IF the odd of the pair is free | 00186 |

TABLE 11-continued

Process Pair

| | | |
|---|---|---|
| | THEN | 00187 |
| 358 | SET found-register to the even of the pair | 00188 |
| | RETURN | 00189 |
| | FI | 00190 |
| | FI | 00191 |
| 360 | END | 00192 |
| 361 | DO for the available registers * looking for two free * | 00194 |
| 383 | IF a register is free | 00195 |
| | THEN | 00196 |
| 384 | SET r2pointer to the other of the pair | 00197 |
| 385 | IF r2pointer is not pointing to a permanent or | 00198 |
| | to an absolute register | 00199 |
| 386 | THEN | 00200 |
| | DO for the remaining registers | 00201 |
| 387 | IF a remaining register is free | 00202 |
| | THEN | 00203 |
| 388 | GENERATE a Load Register instruction to | 00204 |
| | move r2pointer register to this register | 00205 |
| | RETURN | 00206 |
| | FI | 00207 |
| | END | 00208 |
| | FI | 00209 |
| | FI | 00210 |
| 390 | END | 00211 |
| 368 | DO for the available registers * looking for a register * | 00213 |
| | * not in the complete set * | 00214 |
| 369 | IF the last use of the register is prior to the | 00215 |
| | current load point | 00216 |
| | THEN | 00217 |
| 373 | IF it was backstored | 00218 |
| | THEN | 00219 |
| 374 | MOVE it to the backstore | 00220 |
| 376 | SET the register free | 00221 |
| 378 | CALL Process-Pair | 00222 |
| 380 | RETURN | 00223 |
| | FI | 00224 |
| 375 | IF it is read-only | 00226 |
| | THEN | 00227 |
| 376 | SET the register free | 00228 |
| 378 | CALL Process-Pair | 00229 |
| | RETURN | 00230 |
| | FI | 00231 |
| 377 | CALL Backstore | 00232 |
| 379 | IF the register just stored was a pair | 00233 |
| | THEN | 00234 |
| 372 | RETURN | 00235 |
| | FI | 00236 |
| 378 | CALL Process-Pair | 00237 |
| 380 | RETURN | 00238 |
| | FI | 00239 |
| | END | 00240 |
| | ABORT | 00241 |
| | END Process-Pair | 00242 |

Figure 35:
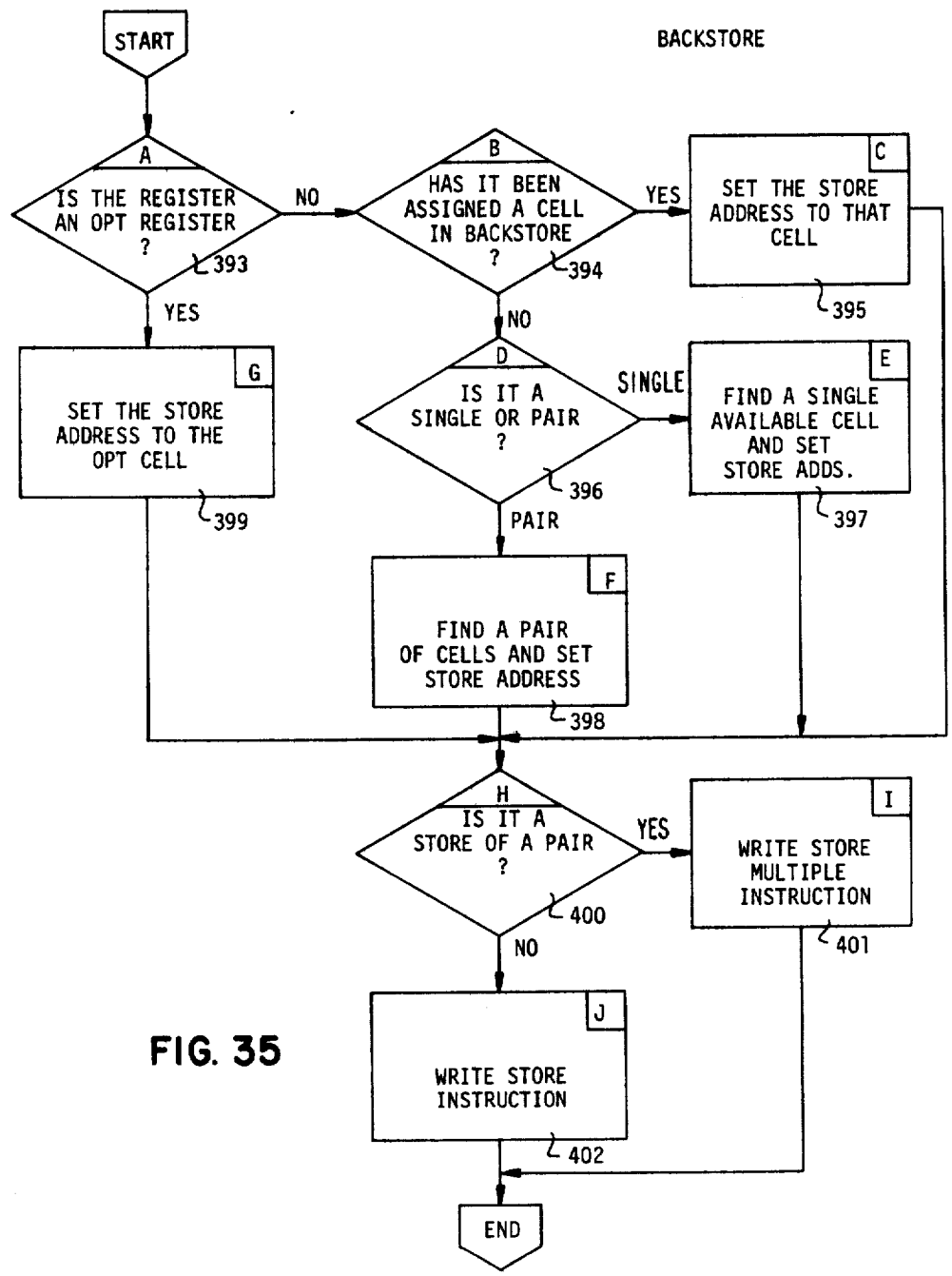

FIG. 35 and Table 12 set forth the backstore procedure, which is internal to register assigner 66, and called from steps 292, 299, etc. In steps 393, 399, optimization registers are directed to the optimization cell in the backstore. In steps 394–398, one or more backstore cells are addressed, and in steps 400–402 the write instructions generated for inclusion in output stream 71 as required to preserve the contents of the one or more registers displaced because not included in the complete set of the current load point instruction.

TABLE 12

Backstore

| | | |
|---|---|---|
| | Backstore PROCEDURE | 00244 |
| 393 | IF it is a symbolic register | 00246 |
| | THEN | 00247 |
| 394 | IF backstore space has not been assigned to it | 00248 |
| | THEN | 00249 |
| 396 | IF it is a register pair | 00250 |
| | THEN | 00251 |
| 398 | FIND two adjacent free backstore slots | 00252 |
| | OTHERWISE | 00253 |
| 397 | FIND a free backstore slot | 00254 |
| | FI | 00255 |
| 397-8 | SET the backstore location in the element | 00256 |
| | FI | 00257 |
| 395 | SET the store address to the backstore cell | 00258 |
| | OTHERWISE | 00259 |
| 399 | SET the store address to the optimized backstore cell | 00260 |

TABLE 12-continued

| | Backstore | |
|---|---|---|
| | FI | 00261 |
| 400 | IF register is a pair | 00263 |
| | THEN | 00264 |
| 401 | WRITE a STORE MULTIPLE instruction | 00265 |
| | OTHERWISE | 00266 |
| 402 | WRITE a STORE instruction | 00267 |
| | FI | 00268 |
| 403 | END Backstore | 00270 |
| | END Register-Assigner | 00272 |

Pass 2 Processor

Figure 36:
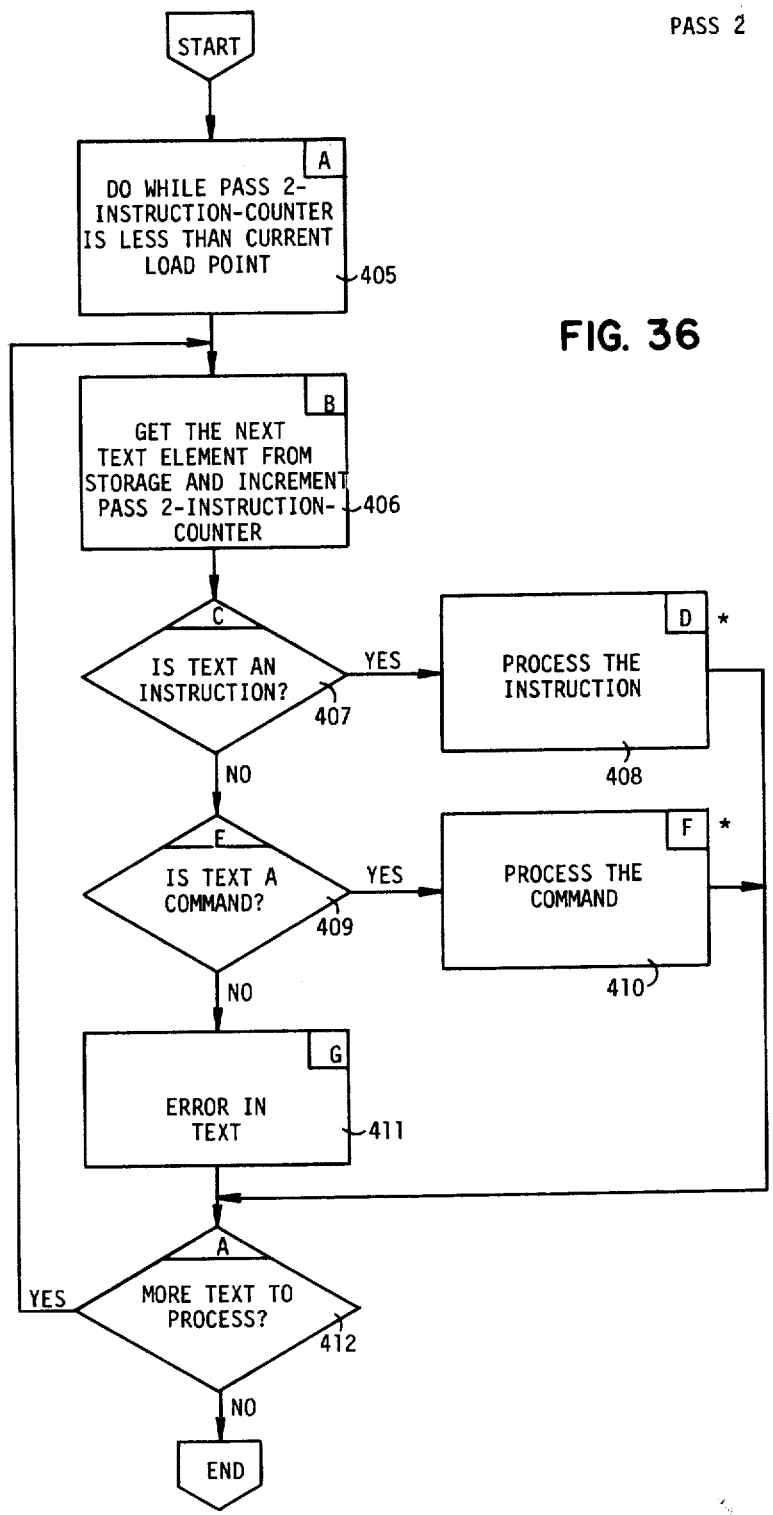
FIGS. 36-38 are flow charts illustrating the method steps executed under control of pass 2 processor 69 of FIG. 1.
Figure 37:
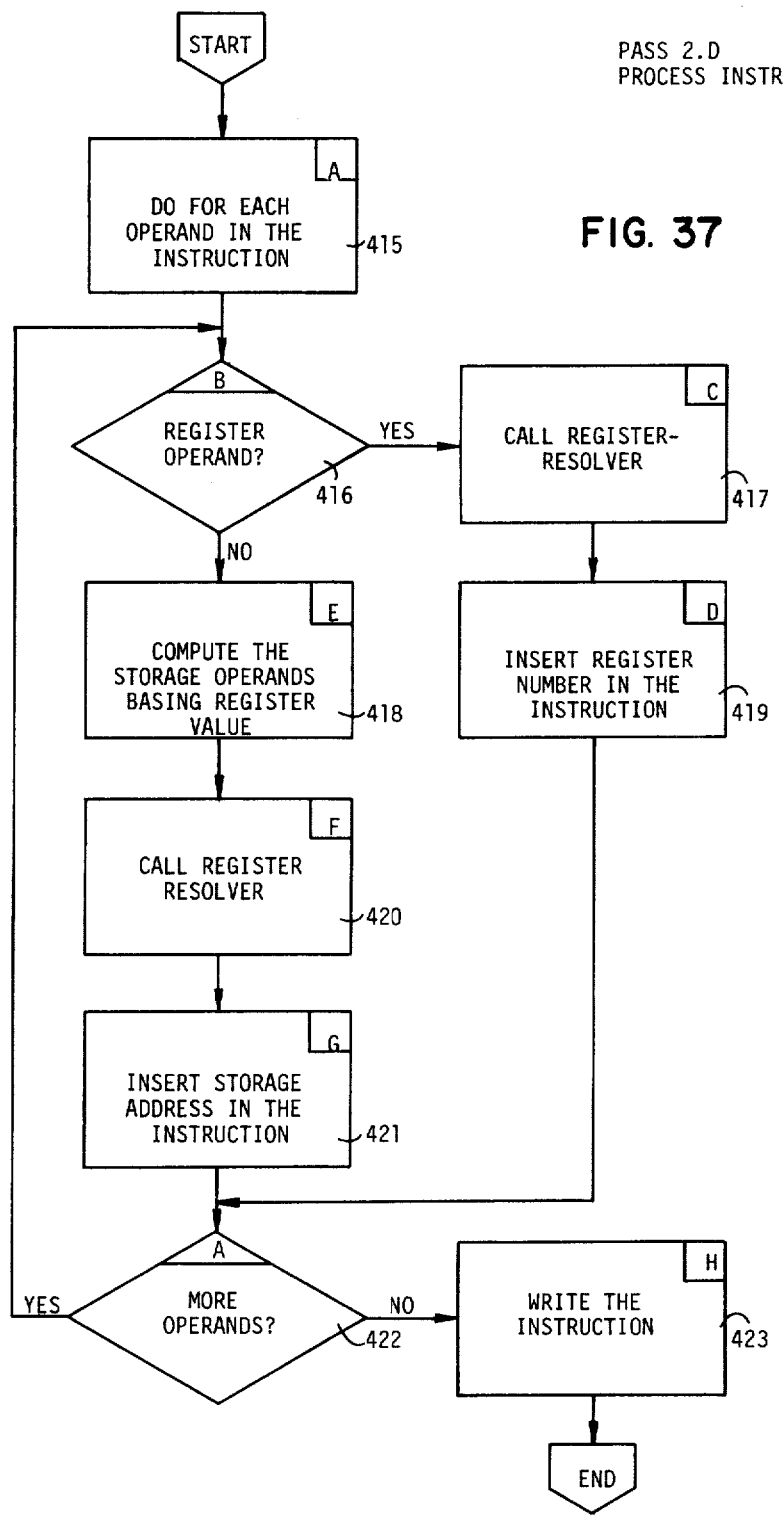
Figure 38:
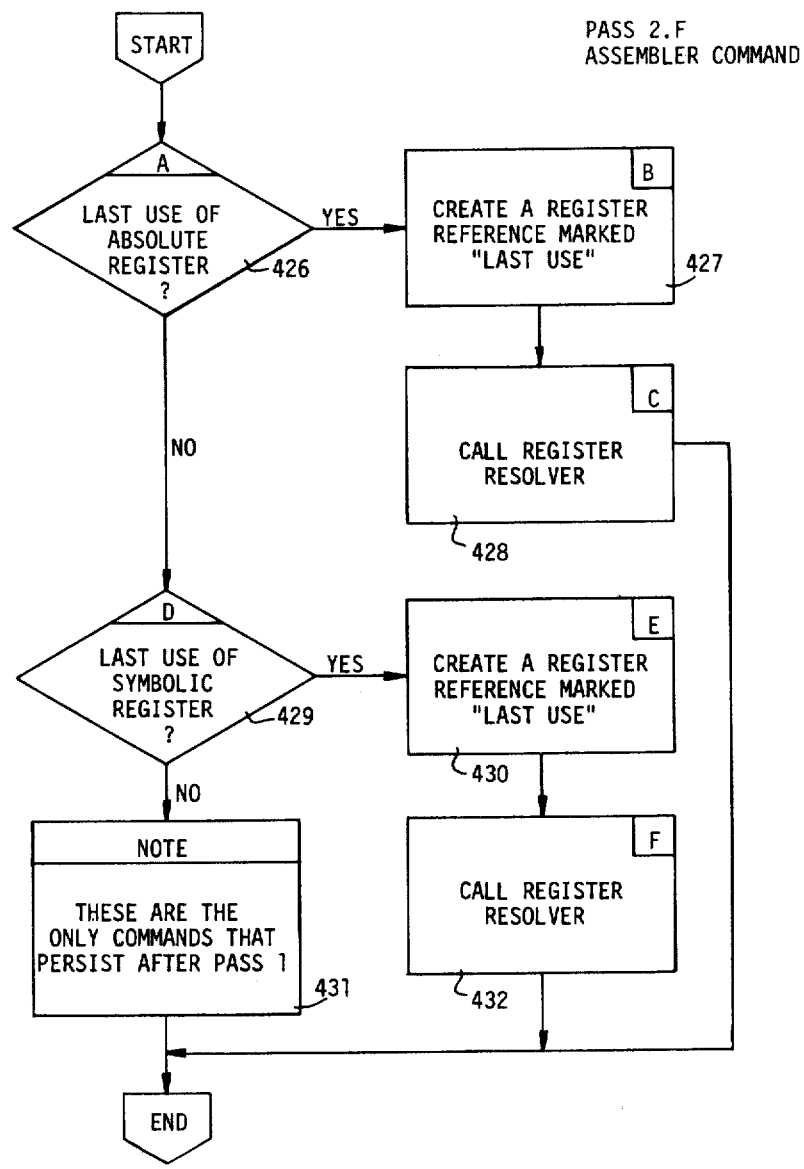

The procedure steps executed by pass 2 processor 69 are set forth in Table 13 and FIGS. 36–38. Pass 2 processor 69, when called, processes the instructions and commands in storage 80 from pass 2 counter 27 location 81 to current load point 25 location 83, with steps 408 (FIG. 37) and 410 (FIG. 38) processing instructions and commands, respectively.

TABLE 13

| | Pass2 Processor | |
|---|---|---|
| | PASS2 Procedure | 00002 |
| 405 | DO WHILE pass2-instruction-counter | 00003 |
| | is less than current-load-point | 00004 |
| 406 | GET the first instruction in storage | 00006 |
| | SET pass2-instruction-counter up by 1 | 00007 |
| | CASE (text type) | 00009 |
| 407 | WHEN (text is an instruction) | 00011 |
| 408 | CALL Process-Instruction | 00012 |
| 409 | WHEN (text is an Assembler command) | 00014 |
| 410 | CALL Assembler-Commands | 00015 |
| | WHEN OTHER | 00017 |
| 411 | ABORT * invalid instruction type * | 00018 |
| 412 | END CASE | 00020 |
| | END | 00022 |
| 414 | Process-Instruction PROCEDURE | 00024 |
| 415 | DO for each operand | 00026 |
| 416 | IF the operand is a register | 00028 |
| | THEN | 00029 |
| 417 | CALL Register-Resolver (Register Operand) | 00030 |
| 419 | INSERT the register number in the instruction | 00031 |
| | OTHERWISE | 00032 |
| 418 | COMPUTE its basing-register-value | 00033 |
| 420 | CALL Register-Resolver (basing-register-value) | 00034 |
| 421 | INSERT the storage address in the instruction | 00035 |
| | FI | 00036 |
| 423 | WRITE the instruction | 00038 |
| 422 | END | 00040 |
| 424 | END Process-Instruction | 00042 |
| | Assembler-Command PROCEDURE | 00044 |
| | CASE (type of command) | 00046 |
| 426 | WHEN (command is to release an actual register) | 00048 |
| | CALL Register-Resolver | 00049 |
| 427–8 | (Register to be released marked "LAST USE") | 00050 |
| 429 | WHEN (command indicates last use of a symbolic register) | 00052 |
| 430–32 | CALL Register-Resolver | 00053 |
| | Symbolic Register marked "LAST USE") | 00054 |
| | END CASE | 00056 |
| 433 | END Assembler-Command | 00058 |
| | END PASS2 | 00060 |

In FIG. 37, each operand of the current instruction is processed to insert the storage address or register number in the instruction to be written out to stream 70. In FIG. 37, register references marked "last use" are created for absolute and symbolic registers, and a call made to register resolver 68.

Register Resolver

Figure 39:
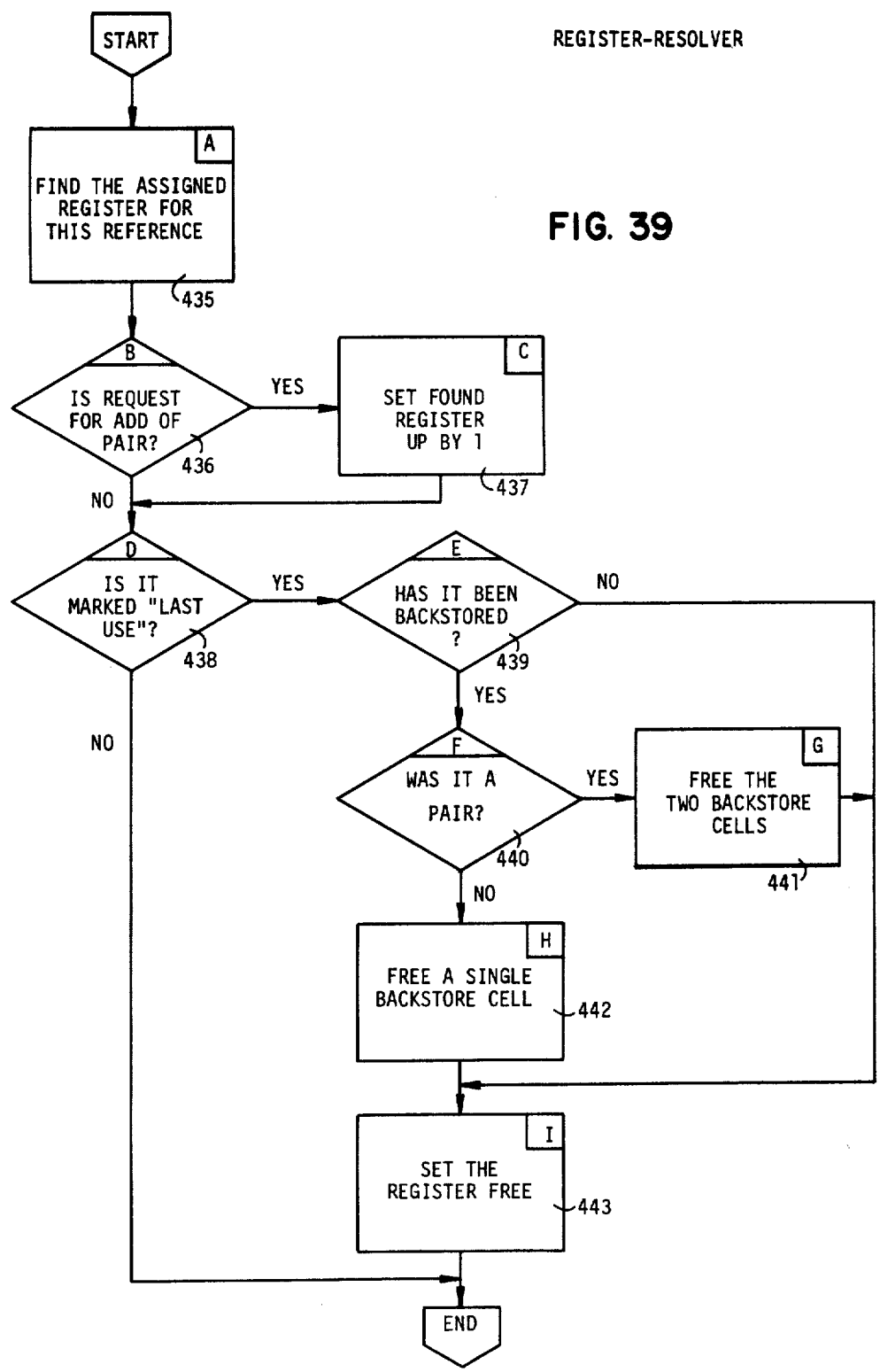
FIG. 39 is a flow chart illustrating the method steps executed under control of register resolver 68 of FIG. 1.

Register resolver 68 operates the computing system according to the method steps set forth in Table 14 and FIG. 39. Its function is to mark registers free (register list 91, field 44 and the backstore cell if required) when the current resistance is a "last use".

TABLE 14

| | Register Resolver | |
|---|---|---|
| | Register-Resolver Procedure | 00002 |
| 435 | SEARCH elements-being-managed | 00004 |
| | beginning with names-search-vector | 00005 |
| | of hash along the hash chain | 00006 |
| | WHEN name of element-being-managed is equal to | 00007 |
| | name of register-request | 00008 |
| | SET found-register to its register number | 00009 |
| 436 | IF the request is for the even of a pair | 00010 |
| | THEN | 00011 |
| | * the register number is correct * | 00012 |
| | OTHERWISE | 00013 |
| | IF the request is for the odd of a pair | 00014 |
| | THEN | 00015 |
| 437 | SET found-register up by 1 | 00016 |
| | FI | 00017 |
| | FI | 00018 |
| 438 | IF it is marked "LAST USE" | 00020 |
| | THEN | 00021 |
| 439 | IF it had been backstored | 00022 |

TABLE 14-continued

| | Register Resolver | |
|---|---|---|
| | THEN | 00023 |
| 440 | IF it is a register pair | 00024 |
| | THEN | 00025 |
| 441 | FREE the two backstore cells | 00026 |
| | OTHERWISE | 00027 |
| 442 | FREE the backstore cell | 00028 |
| | FI | 00029 |
| | FI | 00030 |
| 443 | FREE the register | 00031 |
| | FI | 00032 |
| | END SEARCH | 00034 |
| 444 | END Register-Resolver | 00036 |

EXAMPLES

The following examples assume the availability of three registers which are initially free. The instruction stream is expressed as a string of letters which represent references in input stream 61 to quantities that need to be a register. To avoid undue complexity, only straight line code (no labels) and a uniform register set (any quantity may enter any of the three registers) are illustrated:

Example 1: abcdab . . .

In the hypothetical three register machine the quantities a, b, and c are assigned to the free registers during load points 1, 2, and 3, respectively. When d is encountered, a pending load point 4 exists, a decision delay starts and a collection of data on reuses begins. The reuse of a and b at load points 5 and 6 yield the complete set abd and the quantity c will be displaced.

The above case assumes that the delayed displacement can be made before a second displacement is necessary. In general, however, not enough reuses occur between two such pending load points to make the decision that early.

The load point is that point in the instruction stream at which the instruction must be inserted into a register. A load point quantity enters its register at its load point. During the decision delay following a pending load point, which register that is had not been determined.

Therefore, while one or more decision delays exist, the scan of references to discover the complete set of N−1 reuses (where N is, for the present, the number of registers—here, 3) must consider the reuse of pending load point quantities as well as the quantities in the latest register state. The composition of the complete set may be any permutation of register and pending register quantities.

Example 2: abcdeab

Here the reuse of a and b cause d to displace c. Their reuse after load point 5 make them a complete set for load point 3, and e displaces d. Both reused quantities were in the latest register state prior to the decision delay, abc. The final register state is abe.

Example 3: abcdeab

Example 4: abcdead

In these two examples the complete set for the load point 4 is discovered with the last reference in the string. In example 3, d displaces c when its complete set abd is discovered. The final register state is abd. Note that while b is a member of the complete set for load point 3 a complete set does not yet exist for e.

In example 4, the reuse of d triggers the complete set for load point 5. Load point 4 does not have a complete set. The intermediate state may be adc or abd, in the transition to the complete set register state ade or aed. In this example the complete set contains both a pending load point quantity and a register resident quantity.

Example 5: abcdefde

This example shows that the complete set may be composed of pending quantities only. The reuse of d and e form a complete set with f, at pending load point 6. Load points 4(d) and 5(e) are resolved in the transition to the final register state, which can be in the registers in any permutation of d, e, and f.

The above examples are greatly simplified for clarity merely to illustrate the concepts of complete set count and load point, without the introduction of an essential aspect to the invention, in particular the handling of unlike subsets of registers by manipulation of the complete set count (to provide for registers for which the quantity is not a candidate) as is described in connection with FIGS. 17-18 and 20, and certain other aspects of the invention, such as the processng of a queued LABEL command, FIGS. 12 and 13, and the recursive processing of addressability calculations, FIG. 19.

While the invention has been particularly shown and described with reference to preferred embodiments thereof, it will be understood by those skilled in the art that changes in form and detail may be made therein without departing from the spirit and scope of the invention.

What is claimed is:

1. A method of operating a computing system having a main storage and a plurality of different classes of registers to assign registers to requests serially referenced in an input instruction stream for quantities to be in a register, so as to improve utilization of the registers during execution of a compiled instruction stream, comprising the steps of:
   (1) during a serial scan of the input instruction stream, identifying register usage for quantities, including
      (a) quantities referenced in the input instruction stream which need to be assigned to a register and
      (b) quantities referenced in the input instruction stream which are either assigned to a register or logged to a set of register quantities awaiting assignment to a register;
   (2) upon identifying during step (1) a first quantity which needs to be assigned to a register, logging the first quantity to the set of register quantities awaiting assignment to a register with a control count indicative of the total number of registers for which the first quantity is not a candidate;
   (3) upon identifying during step (1) a second quantity either assigned to a register or logged to the set of register quantities awaiting assignment to a register,
      incrementing the control counts of quantities in the set of register quantities awaiting assignment to a register which are candidates for the same registers as the second quantity, and
      testing for complete sets; and
   (4) assigning a register to those quantities for which a complete set is detected.

2. A method of operating a computing system to transform an input instruction stream into an object code stream, the method integrating the assignment to registers of both symbolic quantities referenced in the input stream and of addressability to such quantities, comprising the steps of:
  (1) during a serial scan of the input instruction stream, determining register usage for input quantities and for addressability quantities;
  (2) upon determining need for an input quantity or adressability quantity to be in a register, enqueuing the quantity in a set of pending register quantities awaiting assignment to a register with a complete set count representing the number of registers for which the quantity is not a candidate;
  (3) upon determining a reuse in the input instruction stream of a quantity already assigned to a register or enqueued in the set of pending register quantities,
    incrementing the complete set counts of quantities in the set of pending register quantities that are candidates for the same registers as the reuse quantity, and
    testing for complete sets; and
  (4) assigning to registers quantities for which a complete set is reached during step (3).

3. The method of claim 2, wherein the input instruction stream comprises a plurality of blocks of instructions, each block being identified by a label, wherein a favorable label is a label identifying a block which is referenced only in blocks already scanned in the instruction stream, and an unfavorable label is a label identifying a block which is referenced in a block which will thereafter be serially scanned, comprising the further steps of:
  (7) during the serial scan of the input instruction stream, determining the presence of favorable labels identifying instruction blocks, and references to labels;
  (8) upon determining the presence of a reference to a label, saving a saved state including a register state for each register;
  (9) upon determining the presence of a favorable label,
    assigning quantities to registers from the set of pending registers quantities irrespective of their complete set count, the defining a current register state immediately prior to said favorable label; and
    assigning quantities to registers to form a new register state at said favorable label, the new register state being selectively the saved state, if access to said favorable label is from an unconditional branch, and otherwise, the ordered intersection of the current and saved states.

4. A method of operating a computing system during compilation of an input instruction stream to assign registers to symbolic quantities referenced in the input instructions, with instructions arranged for serial scanning in an instruction stream including a plurality of blocks of straight line code, each such block identified by a label, wherein a favorable label is a label identifying a block which is referenced only in blocks already scanned in the instruction stream, and an unfavorable label is a label identifying a block which is referenced in a block which will thereafter be serially scanned, the method generating a compiled instruction stream which optimizes register manipulation during subsequent execution of the compiled instruction stream and comprising the steps of:
  (1) during a serial scan of the input instruction stream, determining register usage for quantities, the presence of favorable labels identifying blocks, and references in instructions to labels;
  (2) upon determining during step (1) the need for a quantity to be in a register, enqueuing the quantity in a set of pending register requests with a complete set count representing the number of registers for which the quantity is not a candidate;
  (3) upon determining during step (1) a reuse of a quantity in a register or in the set of pending register requests,
    incrementing the complete set counts of quantities in the set of pending register requests that are candidates for the same registers as the reuse quantity and
    testing the complete set counts for complete set;
  (4) assigning to registers quantities for which a complete set is reached during step (3);
  (5) upon determining during step (1) the presence of a reference to a label, saving a saved state including a register state for each register;
  (6) upon determining during step (1) the presence of a favorable label,
    assigning to registers quantities in the set of pending requests irrespective of their complete set counts, thereby forming a current register state; and
    assigning registers to quantities to form a new state at said favorable label, the new state being selectively the saved state, if said favorable label is reached only from an unconditional branch or, otherwise, being the ordered intersection of the current and saved states.

5. A computing system for compiling an input instruction stream, having a plurality of instructions including requests for quantities in a register, comprising:
  means for determining, during a serial scan of the instruction stream, requests for new and reuse quantities in a register;
  means responsive to the determination of a request for a new quantity in a register for logging the quantity to a pending set of requests for quantities in a register with a complete set count indicative of the total number of registers for which the quantity is not a candidate;
  means responsive to the determination of a request for a reuse quantity assigned to a register or logged to the pending set for incrementing the complete set count of quantities in the pending set, and for testing for complete sets;
  means for assigning to registers those quantities for which a complete set is detected.

6. A computing system for compiling a machine readable input instruction stream into a machine executable instruction stream, comprising:
  input storage means 60 for storing a plurality of input instructions, selected instructions including symbolic designations for quantities to be assigned to registers;
  output storage means 70 for storing a plurality of executable instructions, including register manipulation instructions;
  temporary storage means 80 for storing instructions read from said input storage means 60 until the register state for the instruction is defined and the instruction written into said output storage means 70;
  pending queue means 92 for storing pending requests for quantities in a register;

complete set point means 24 for identifying the last pending request added to said pending queue means for which a complete set has been determined;

current load point counter means 25 for identifying the location in temporary storage 80 of a current load point instruction;

pass one processor means 64 for writing instructions from input storage means 60 into temporary storage means 80, for adding to said pending queue means 92 requests to save register states at references to labels, and for generating from said instructions, requests for quantities in a register;

register manager means 65 responsive to requests serially referenced in the input instruction streams for quantities to be in a register for recursively generating requests for addressability quantities in a register; for adding to pending queue means 92 requests for new quantities with a complete set count indicative of the number of registers for which the quantity is not a candidate; for adding reuse quantities to the complete set count of pending requests in queue means 92; and, upon detecting a complete set, for updating complete set pointer means 24 to reference the quantity having the complete set;

register assigner means 66 selectively responsive to the detection of a complete set and to the presence of a label for generating a write call to write all instructions prior to that referenced by said current load point counter means;

pass two processor means 69 responsive to the write call for detecting requests for symbolic or addressability registers and, thereupon, for generating a resolve call; and register resolver means 68 responsive to the resolve call for resolving requests for symbolic or addressability registers by assigning the register request to a location in register list 91.

* * * * *